US010613811B2

(12) United States Patent
Hardacker et al.

(10) Patent No.: US 10,613,811 B2
(45) Date of Patent: Apr. 7, 2020

(54) DRIVING MULTIPLE DISPLAY DEVICES WITH A SINGLE DISPLAY PORT

(71) Applicant: QUALCOMM Incorporated, San Diego, CA (US)

(72) Inventors: Robert Hardacker, Fallbrook, CA (US); John C. K. Wong, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 15/919,091

(22) Filed: Mar. 12, 2018

(65) Prior Publication Data

US 2018/0260184 A1 Sep. 13, 2018

Related U.S. Application Data

(60) Provisional application No. 62/470,852, filed on Mar. 13, 2017, provisional application No. 62/624,780, filed on Jan. 31, 2018.

(51) Int. Cl.
*G06F 3/14* (2006.01)
*G09G 5/00* (2006.01)
(Continued)

(52) U.S. Cl.
CPC .......... *G06F 3/1431* (2013.01); *G06F 3/1438* (2013.01); *G06F 3/1446* (2013.01);
(Continued)

(58) Field of Classification Search
CPC combination set(s) only.
See application file for complete search history.

(56) References Cited

U.S. PATENT DOCUMENTS 6,118,413 A 9/2000 Bril et al.
6,970,173 B2 11/2005 Ciolac
(Continued)

FOREIGN PATENT DOCUMENTS

EP 1439455 A1 7/2004

OTHER PUBLICATIONS

International Search Report and Written Opinion—PCT/US2018/022148—ISA/EPO—dated Aug. 14, 2018.
(Continued)

*Primary Examiner* — Deeprose Subedi
(74) *Attorney, Agent, or Firm* — MG-IP Law, P.C.

(57) ABSTRACT

Systems, methods, and apparatus for communicating video data in packed frames are described. The video data corresponds to multiple asymmetrical display devices, and the packed frames are transmitted through a single display port. In one example a method includes receiving video data targeted to multiple display devices, the data for each display being provided as a set of scanlines for display at a first clock rate, inserting padded scanlines into the set of scanlines to obtain a padded set of scanlines that includes the same number of scanlines a second display device, generating a packed frame by combining the padded set of scanlines with the set of scanlines corresponding to the second display device, and transmitting the packed frame over a communication link. The display devices may have different resolutions. The location of each padded scanline in the padded set of scanlines is identified by configuration information.

38 Claims, 15 Drawing Sheets

(51) Int. Cl.
*G09G 5/14* (2006.01)
*G09G 5/395* (2006.01)
*G09G 5/18* (2006.01)
*G09G 5/393* (2006.01)

(52) U.S. Cl.
CPC ............ *G09G 5/005* (2013.01); *G09G 5/006* (2013.01); *G09G 5/14* (2013.01); *G09G 5/18* (2013.01); *G09G 5/393* (2013.01); *G09G 5/395* (2013.01); *G09G 2340/0407* (2013.01); *G09G 2340/0435* (2013.01); *G09G 2360/02* (2013.01); *G09G 2360/04* (2013.01); *G09G 2360/125* (2013.01); *G09G 2370/04* (2013.01); *G09G 2370/12* (2013.01); *G09G 2370/20* (2013.01); *G09G 2380/10* (2013.01)

(56) References Cited

U.S. PATENT DOCUMENTS

| | | |
|---|---|---|
| 7,629,945 B2 | 12/2009 | Baudisch |
| 8,836,612 B2 | 9/2014 | Roh |
| 8,994,713 B2 | 3/2015 | Sirpal et al. |
| 9,225,961 B2 | 12/2015 | Chen et al. |
| 2003/0043155 A1 | 3/2003 | Wasserman et al. |
| 2014/0240330 A1* | 8/2014 | Mahe .................. G06F 3/1431 345/520 |
| 2016/0055830 A1 | 2/2016 | Lee et al. |

OTHER PUBLICATIONS

Partial International Search Report—PCT/US2018/022148—ISA/EPO—dated Jun. 5, 2018.

\* cited by examiner

DRIVING MULTIPLE DISPLAY DEVICES WITH A SINGLE DISPLAY PORT

CROSS-REFERENCE TO RELATED APPLICATIONS

The present Application for Patent claims the benefit of U.S. Provisional Application No. 62/470,852, entitled "DRIVING MULTIPLE DISPLAYS WITH A SINGLE DISPLAY PORT", filed Mar. 13, 2017, assigned to the assignee hereof, and expressly incorporated herein by reference in its entirety. The present Application for Patent also claims the benefit of U.S. Provisional Application No. 62/624,780, entitled "DRIVING MULTIPLE DISPLAYS WITH A SINGLE DISPLAY PORT", filed Jan. 31, 2018, assigned to the assignee hereof, and expressly incorporated herein by reference in its entirety.

FIELD OF DISCLOSURE

One or more aspects of the present disclosure generally relate to apparatus and methods for managing, controlling and operating video display devices.

BACKGROUND

Electronic communication and computational devices may include a variety of components including circuit boards, integrated circuit (IC) devices and/or System-on-Chip (SoC) devices. SoC devices, and other IC devices, perform increasingly complex functions using distinct functional modules and/or circuits. Increased functionality can drive demand for input/output (I/O) pins and connectors in IC devices and can result in increased interconnection complexity.

In many instances, the increased functionality can result in a need for multiple video display devices with greater display capabilities. Communication links that connect display devices to application processors and other sources of video information may not meet the demands resulting from increased functionality standards. Certain industry standard communication links may be employed to connect display devices. In one example, the High-Definition Multimedia Interface (HDMI) implements certain Video Electronics Standards Association (VESA), Electronic Industries Alliance (EIA), and Consumer Electronics Association (CEA) standards, which define video formats and waveforms, transport of compressed, uncompressed, audio and auxiliary data. In another example, the Display Serial Interface (DSI) standards are specified by the Mobile Industry Processor Interface (MIPI) Alliance. In another example, the DisplayPort standard defines a digital display interface developed by VESA. The DisplayPort interface can carry video, audio, USB, and other forms of data.

As design of communication and computational devices continue to increase in complexity and include a greater level of functionality, there is a continual need for improved display management and communication technologies.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An example video controller is disclosed. The video controller may comprise a frame generator and a display port. The frame generator may be configured to receive and/or generate video data comprising first and second frames respectively for display at first and second display devices. The first frame may comprise a set of first scanlines and the second frame may comprise a set of second scanlines. The frame generator may also be configured to generate a padded frame based on vertical resolutions of the first and second display devices. The padded frame may comprise a set of padded scanlines, and the vertical resolution of the first display device may be greater than the vertical resolution of the second display device. The frame generator may further be configured to generate a packed frame based on the first frame, the second frame, and the padded frame. The packed frame may comprise a set of packed scanlines. The display port may be configured to transmit the packed frame at a transmission rate to the first and second display devices over a communication link. The communication link may be coupled to both the first and second display devices.

An example method performed at a video controller is disclosed. The method may comprise receiving and/or generating video data comprising first and second frames respectively for display at first and second display devices. The first frame may comprise a set of first scanlines and the second frame may comprise a set of second scanlines. The method may also comprise generating a padded frame based on vertical resolutions of the first and second display devices. The padded frame may comprise a set of padded scanlines, and the vertical resolution of the first display device may be greater than the vertical resolution of the second display device. The method may further comprise generating a packed frame based on the first frame, the second frame, and the padded frame. The packed frame may comprise a set of packed scanlines. The method may yet comprise transmitting the packed frame at a transmission rate through a display port to the first and second display devices over a communication link. The communication link may be coupled to both the first and second display devices.

An example video controller is disclosed. The video controller may comprise means for receiving and/or generating video data comprising first and second frames respectively for display at first and second display devices. The first frame may comprise a set of first scanlines and the second frame may comprise a set of second scanlines. The video controller may also comprise means for generating a padded frame based on vertical resolutions of the first and second display devices. The padded frame may comprise a set of padded scanlines, and the vertical resolution of the first display device may be greater than the vertical resolution of the second display device. The video controller may further comprise means for generating a packed frame based on the first frame, the second frame, and the padded frame. The packed frame may comprise a set of packed scanlines. The video controller may yet comprise means for transmitting the packed frame at a transmission rate through a display port to the first and second display devices over a communication link. The communication link may be coupled to both the first and second display devices.

An example processor readable medium is disclosed. The processor readable medium may be a non-transitory storage medium that may store code that, when executed by one or more processors of a video controller, causes the video controller to receive and/or generate video data comprising first and second frames respectively for display at first and second display devices. The first frame may comprise a set of first scanlines and the second frame may comprise a set of second scanlines. The code may also cause the video controller to generate a padded frame based on vertical resolutions of the first and second display devices. The padded frame may comprise a set of padded scanlines, and the vertical resolution of the first display device may be greater than the vertical resolution of the second display device. The code may further cause the video controller to generate a packed frame based on the first frame, the second frame, and the padded frame. The packed frame may comprise a set of packed scanlines. The code may yet cause the video controller to transmit the packed frame at a transmission rate through a display port to the first and second display devices over a communication link. The communication link may be coupled to both the first and second display devices.

An exemplary display controller of a display device is disclosed. The display controller may comprise an interface port, a frame filter and a display driver. The interface port may be configured to receive a packed frame from a video controller over a communication link at a transmission rate. The packed frame may comprise a set of packed scanlines. The communication link may also be coupled to another display device. The frame filter may be configured to extract a display frame and another display frame from the packed frame. The display frame may comprise a set of display scanlines, and the another display frame may comprise a set of other display scanlines. The display driver may be configured to drive the display device with the display frame at a display data rate. Vertical resolutions of the display device and the another device may be different. Also, the transmission rate may be greater than the display data rate.

An exemplary method performed at a display controller of a display device is disclosed. The method may comprise receiving a packed frame from a video controller over a communication link at a transmission rate. The packed frame may comprise a set of packed scanlines. The communication link may also be coupled to another display device. The method may also comprise extracting a display frame and another display frame from the packed frame. The display frame may comprise a set of display scanlines, and the another display frame may comprise a set of other display scanlines. The method may further comprise driving the display device with the display frame at a display data rate. Vertical resolutions of the display device and the another device may be different. Also, the transmission rate may be greater than the display data rate.

An exemplary display controller of a display device is disclosed. The display controller may comprise means for receiving a packed frame from a video controller over a communication link at a transmission rate. The packed frame may comprise a set of packed scanlines. The communication link may also be coupled to another display device. The display controller may also comprise means for extracting a display frame and another display frame from the packed frame. The display frame may comprise a set of display scanlines, and the another display frame may comprise a set of other display scanlines. The display controller may further comprise means for driving the display device with the display frame at a display data rate. Vertical resolutions of the display device and the another device may be different. Also, the transmission rate may be greater than the display data rate.

An example processor readable medium is disclosed. The processor readable medium may be a non-transitory storage medium that may store code that, when executed by one or more processors of a display controller, causes the display controller to receive a packed frame from a video controller over a communication link at a transmission rate. The packed frame may comprise a set of packed scanlines. The communication link may also be coupled to another display device. The code may also cause the display controller to extract a display frame and another display frame from the packed frame. The display frame may comprise a set of display scanlines, and the another display frame may comprise a set of other display scanlines. The code may further cause the display controller to drive the display device with the display frame at a display data rate. Vertical resolutions of the display device and the another device may be different. Also, the transmission rate may be greater than the display data rate.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
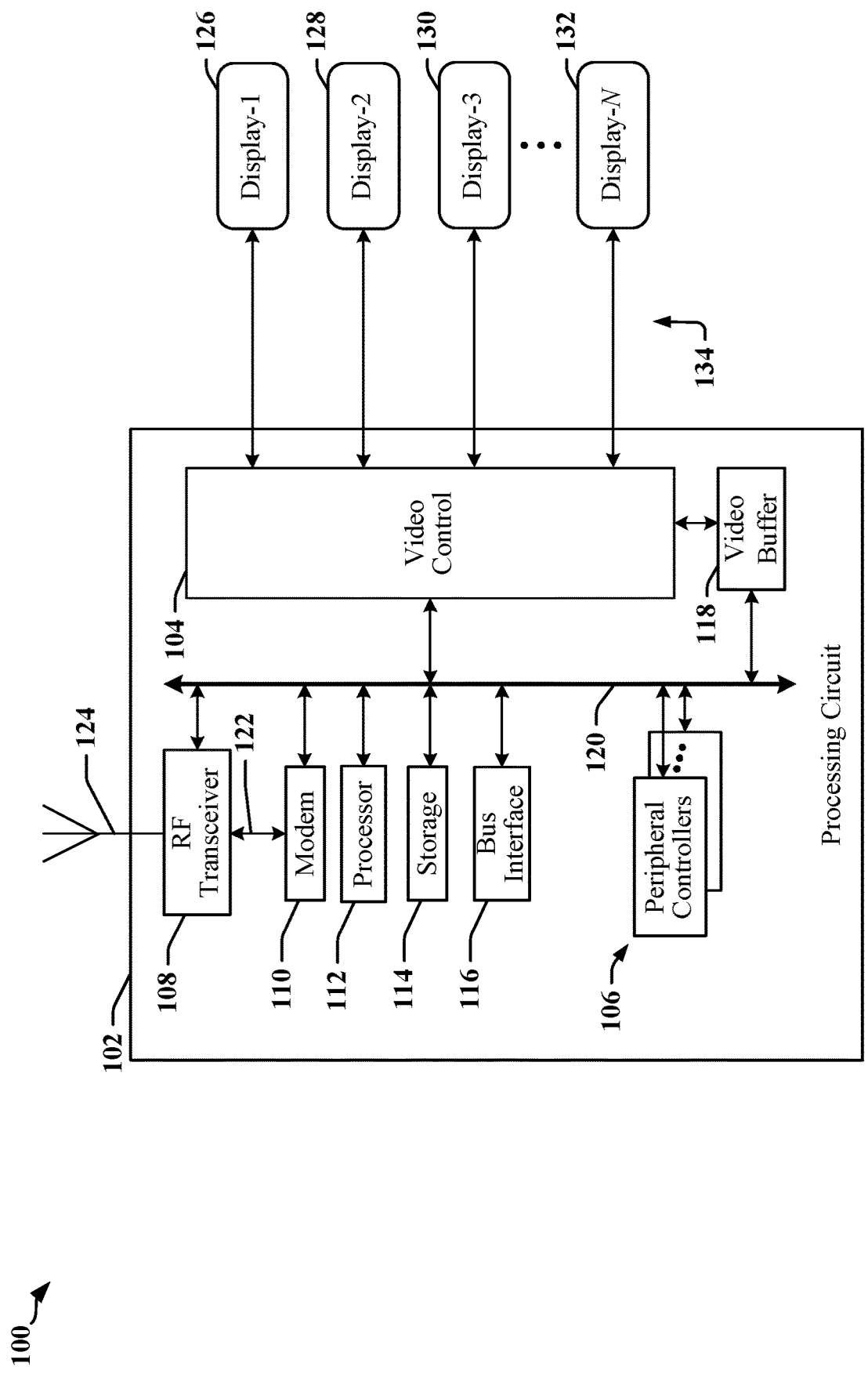
FIG. 1 illustrates an example of an apparatus configurable to drive a plurality of physical display devices.

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments of the disclosed subject matter include the discussed feature, advantage or mode of operation.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, processes, operations, elements, and/or components, but do not preclude the presence or addition of one or more other features, integers, processes, operations, elements, components, and/or groups thereof.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects may be embodied in a number of different forms, all of which have been contemplated to be within the scope of the claimed subject matter. In addition, for each of the examples described herein, the corresponding form of any such examples may be described herein as, for example, "logic configured to" perform the described action.

Certain aspects described herein relate to apparatuses and methods that communicate video data in packed frames. The video data in each packed frame may correspond to asymmetrical display devices, or simply display devices. The packed frames may be transmitted through a single display port coupled to multiple asymmetrical display devices.

Video display information may be generated by a variety of processing systems, including processing system embedded in various devices, vehicles, appliances, manufacturing equipment and other equipment. For example, certain components of the processing systems may be incorporated in SoCs that are subcomponents of an apparatus such as a cellular phone, a smart phone, a session initiation protocol (SIP) phone, a server, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may have embedded video data generation capabilities and may be configurable to drive a plurality of display devices. The apparatus 100 may include a processing circuit 102 comprising a plurality of circuits or devices 104, 106 and/or 108, which may be implemented in one or more ASICs, including an SoC. In one example, the apparatus 100 may perform communication, navigation, control/instrumentation display and/or entertainment functions. The processing circuit 102 may include one or more processors 112, one or more peripheral controller 106, and a transceiver 108 that enables the apparatus to communicate through an antenna 124 with a local network, a Bluetooth network, a radio access network, a core access network, the Internet and/or another network. The processing circuit 102 may have one or more modems 110, on-board storage 114, a bus interface circuit 116 and/or other logic circuits or functions.

The processing circuit 102 may be controlled by one or more operating systems that may provide an application programming interface (API) layer that enables the one or more processors 112 to execute software modules residing in the on-board storage 114 or other processor-readable storage (including the video buffer 118) that may be provided on the processing circuit 102. The processing circuit 102 may be configured to have access to storage(s) internal and/or external to the processing circuit 102. The software modules may include instructions and data stored in the on-board storage 114 or other storage. The on-board storage 114 may include read-only memory (ROM), random-access memory (RAM), electrically erasable programmable ROM (EEPROM), flash cards, or any memory device that can be used in processing systems and computing platforms. The processing circuit 102 may include, implement, or have access to a local database, look-up tables or other parameter storage that can maintain operational parameters and other information used to configure and operate the apparatus 100 and/or the processing circuit 102. The local database and/or look-up tables may be implemented using registers, a database module, flash memory, magnetic media, EEPROM, soft or hard disk, or the like. The processing circuit 102 may also be operably coupled to external devices such as the antenna 124, one or more display devices 126, 128, 130, 132, among other components. A video controller 104 may be configured to manage, configure and/or operate the display devices 126, 128, 130, 132 through dedicated communication links 134, which may include serial data interconnects that comply or are compatible with a VESA, EIA, CEA, or MIPI Alliance standard, for example.

The processing circuit 102 may provide one or more buses 120, 122 that enable certain devices 104, 106, 108, 110, 112, 114, 116 and/or 108 to communicate with one another.

The processing circuit 102 may include or control a power management function that configures and manages the operation of the apparatus 100.

Figure 2:
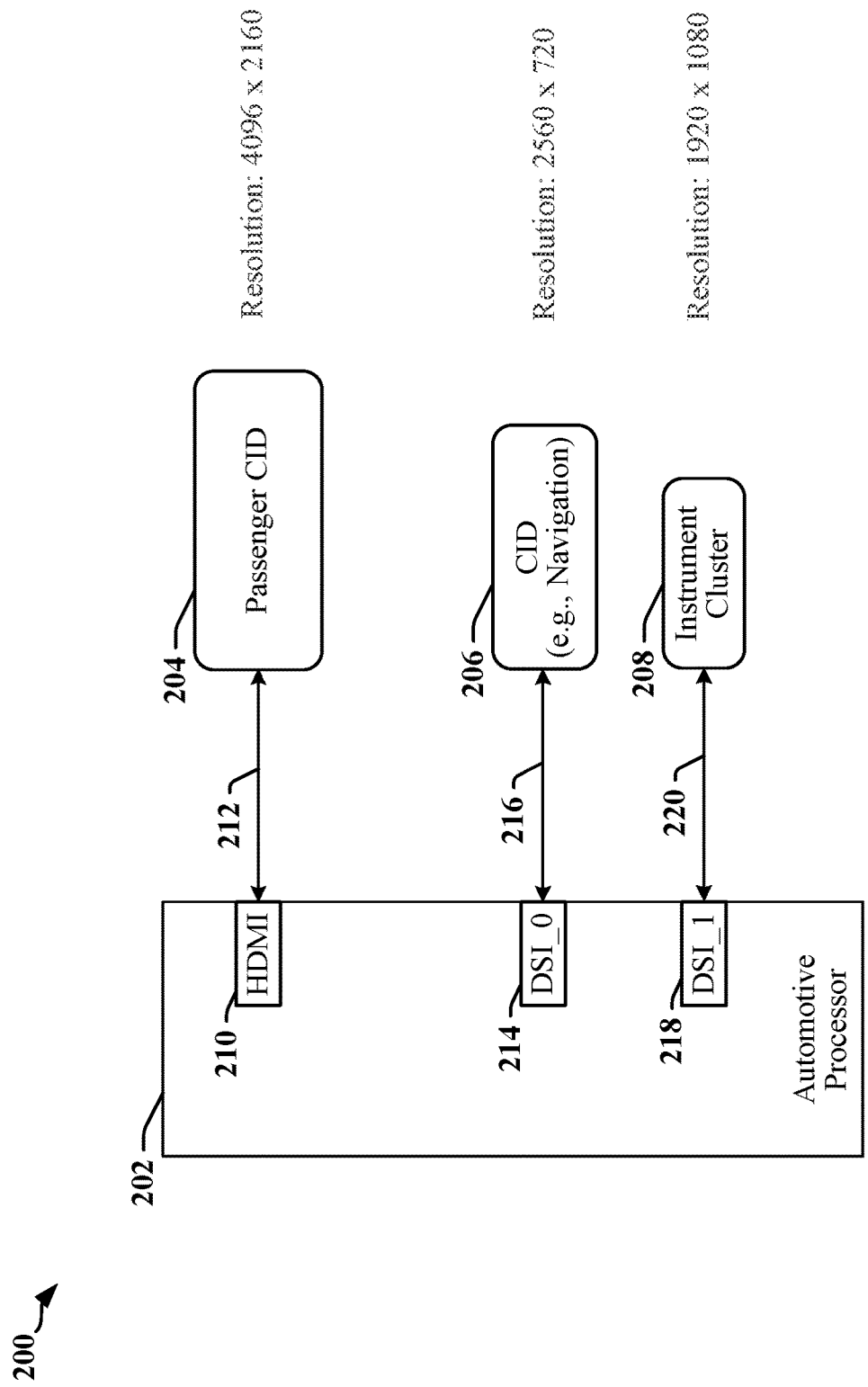
FIG. 2 illustrates an example of an apparatus deployed in an automotive implementation.

FIG. 2 illustrates an example of the apparatus 200 of FIG. 1 deployed in an automotive implementation. In this example, the processing circuit maybe implemented as an automotive processor 202 that is coupled to multiple display devices 204, 206, 208. The automotive processor 202 may be coupled to a first display device 204 over a first communication link 212 using a first display port 210. In this instance, the first display port 210 is assumed to be configured for an HDMI mode of operation. The automotive processor 202 may be coupled to a second display device 206 over a second communication link 216 using a second display port 214, which is assumed to be configured for a DSI mode of operation. The automotive processor 202 may be coupled to a third display device 208 over a third communication link 220 using a third display port 218, which is also assumed to be configured for the DSI mode of operation. The display devices 204, 206, 208 may have a same or different display resolutions. For example, the first display device 204 may be configured as a passenger central information display (CID) with a resolution of 4096×2160. The second display device 206 may be configured as a navigation CID with a resolution of 2560×720. The third display device 208 may be configured to operate as an instrument cluster with a resolution of 1920×1080.

In another aspect, a processor may provide enhanced capabilities that include the ability to drive two or more display devices from a single display port. For example, standards such as DSI and HDMI define basic methods for transmitting symmetrical (same resolution and format) display frames for two separate display devices, or for transmitting a single display frame at twice the nominal refresh rate. A two-display per display port may enable three-dimensional (3D) television or movie playback such that a single display is driven at 120 Hz with each of the left eye data and right eye data rendered alternately at 60 Hz. A viewer may wear special glasses that enable only the appropriate eye to view the alternating left-eye/right-eye display. Left and right eye data are captured from a slightly different perspective that corresponds to the distance between two human eyes. In another example, virtual reality headsets may be used where a single data stream drives separate virtual and actual display corresponding to the appropriate eye. In both examples, the video data stream is configured for identical—or symmetrical—display devices with the same timing parameters, including frame-rate, vertical and horizontal blanking, line length, bits per pixel, etc.

Figure 3:
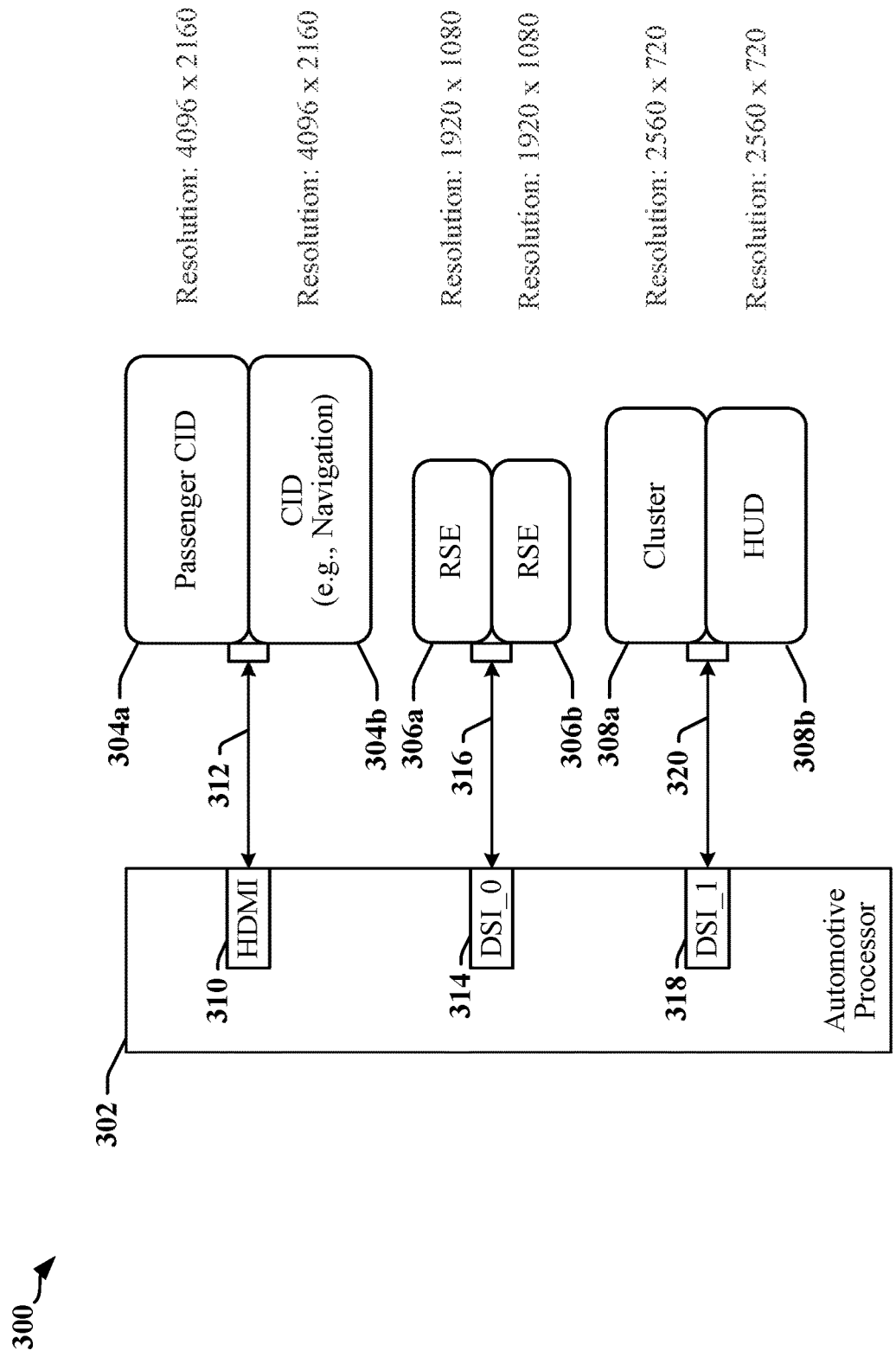
FIG. 3 illustrates an example of an apparatus in which one or more display ports may be configured to drive a plurality of display devices.

FIG. 3 illustrates an example of an apparatus 300 that can drive two or more display devices from a single display port. The apparatus 300 may include an automotive processor 302 adapted to take advantage of a video controller that can send data for two display devices 304a/304b, 306a/306b, 308a/308b through a single display port 310, 314, 318. The corresponding communication link 312, 316, 320 may be driven at 120 Hz with the data for each of the display devices 304a/304b, 306a/306b, 308a/308b being rendered at 60 Hz. In the illustrated example, the first display port 310 may drive CID display devices, the second display port 314 may drive rear seat entertainment (RSE) display devices, and the third display port 318 may feed a heads-up display (HUD) and an instrumentation cluster display.

The apparatus 300 illustrates HDMI and DSI implementations, which are used by way of example, and other types of interfaces may be adapted for use as illustrated. HDMI and DSI standards support Multi-Stream Transport (MST) protocols that enable video data for two display devices 304a/304b, 306a/306b, 308a/308b through a single display port 310, 314, 318. These protocols require that the display formats be symmetrical. For example, the display resolutions of the first pair of display devices 304a/304b (4096× 2160) are identical to each other. The same is true for the second pair of display devices 306a/306b (1920×1080) and for the third pair of display devices 308a/308b (2560×720).

Figure 4:
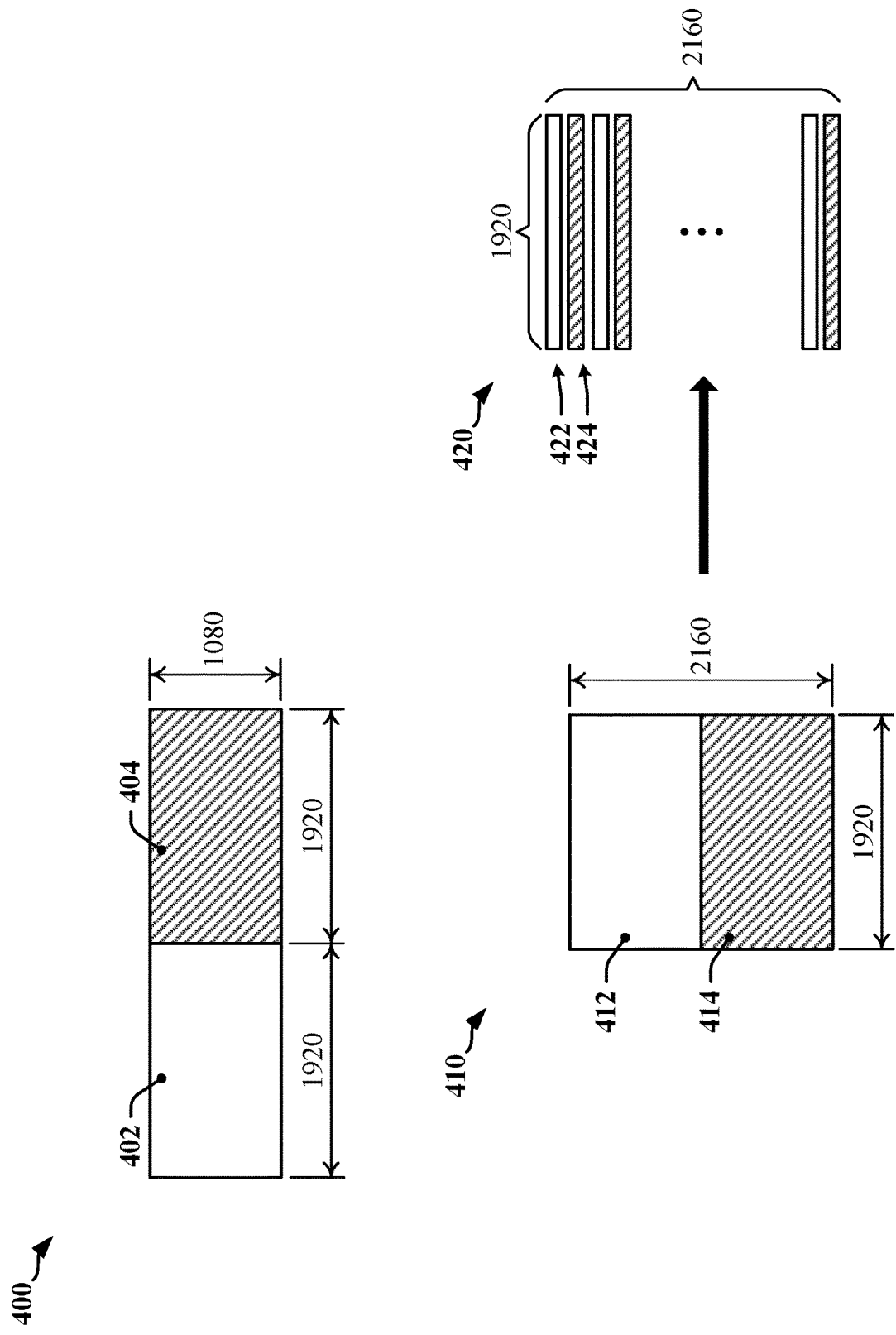
FIG. 4 illustrates example ways to partition a display frame when a display port drives a plurality of display devices.

Referring to FIG. 4, video data may be organized in scanlines, in which each scanline represents a single row of pixels in a raster graphics image. That is, each scanline can represent a horizontal row of pixels to be displayed. When MST is employed, scanlines from each display are packed into a frame to be transmitted at 120 Hz (for example). For the apparatus 300 of FIG. 3, a side-by-side packing 400 or a top-to-bottom packing 410 may be employed.

Assume that the video data for the pair of display devices 308a/308b is being organized. When the side-by-side packing 400 is used, first and second display device data 402, 404 (e.g., respectively corresponding to display devices 308a, 308b) are arranged horizontally. The display device data 402, 404 may also be referred to as first and second frames. The scanlines in the side-by-side packing 400 have greater length than defined by the horizontal resolution for each individual display data or frame. When the top-to-bottom packing 410 is used, first and second frames 412, 414 (e.g., again corresponding to display devices 308a, 308b) are arranged vertically. As a result, the number of scanlines is doubled with respect to the resolution for each individual display when the top-to-bottom packing 410 is used. The top-to-bottom packing 410 may use fewer SoC line buffers than the side-by-side packing 400.

A variant of the side-by-side packing 400 may be referred to as super-frame packing, which may use two line buffers in the automotive processor 302. A variant of top-to-bottom packing 410 may be referred to as full-frame packing, and may be implemented with a single line buffer in the automotive processor 302. In another MST packing variant, line interleave packing 420 may be employed, where scanlines are selected alternately from the first and second frames 412, 414. For example, each scanline 422 from the first frame 412 may be transmitted alternately with each scanline 424 from the second frame 414.

In applications such as in an automotive setting, display needs often exceed the capacity provided by available display ports for a given processing circuit such as an SoC. Display devices of various resolutions are often required in automotive applications and it may be impractical or costly to support symmetric display configurations that can be driven through a single display port. Therefore, in accordance with certain aspects disclosed herein, multiple asymmetrical display devices may be driven through a single display port. Two display devices may be asymmetrical when one or both of the vertical and horizontal display resolutions of the two display devices are different.

Figure 5:
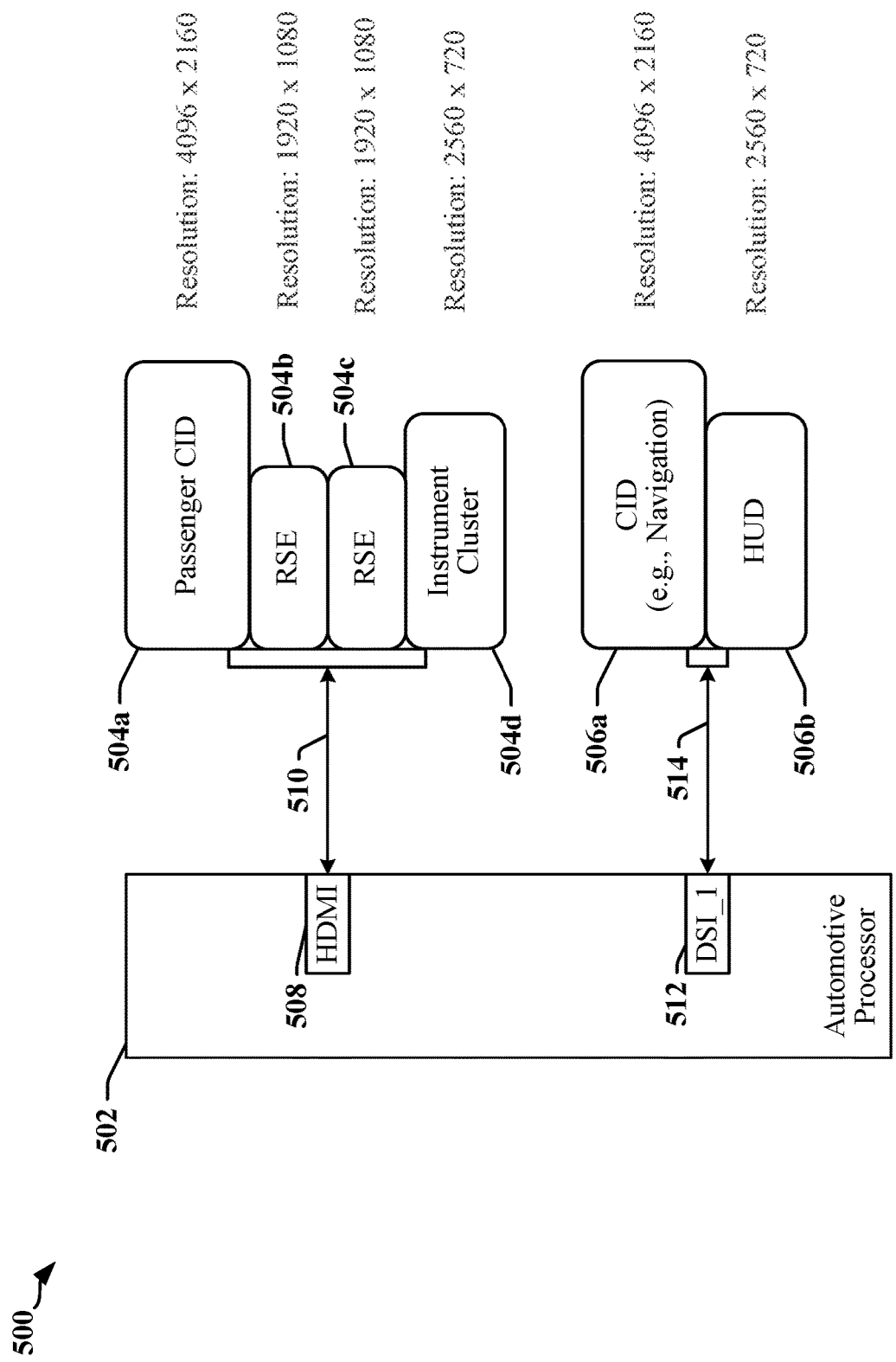
FIG. 5 illustrates an example of an apparatus in which one or more display ports may be configured to drive a plurality of asymmetrical display devices.

FIG. 5 illustrates an example of an apparatus 500 configured to drive a plurality of asymmetrical display devices from a single display port. The apparatus 500 may include an automotive processor 502 configured to provide a video controller that can send data through a first display port 508 to four asymmetrical display devices 504a, 504b, 504c, 504d over a corresponding communication link 510. The first display port 508 may be configured to operate in a manner that is compatible or compliant with the HDMI specifications.

The video controller may also send data through a second display port 512 for two asymmetrical display devices 506a, 506b over a corresponding communication link 514. In the illustrated example, the second display port 512 may be configured to operate in a manner that is compatible or compliant with DSI specifications. DSI standards do not define protocols or otherwise support MST for asymmetrical display devices. The use of a single I/O port to send a packed frame containing video data for two display devices can enable elimination of one or more serializers/deserializer (SERDES) pairs, and can thereby yield significant cost savings for manufacturers.

While HDMI and DSI compliant ports are illustrated, other display interface protocols are contemplated. For example, a DP (DisplayPort) compliant may be configured to provide video data to a plurality of asymmetrical display devices. Indeed, it is contemplated that the apparatus 500 may comprise any number of display ports each of which may be configured to drive a plurality of, i.e., two or more, asymmetrical display devices.

Figure 6:
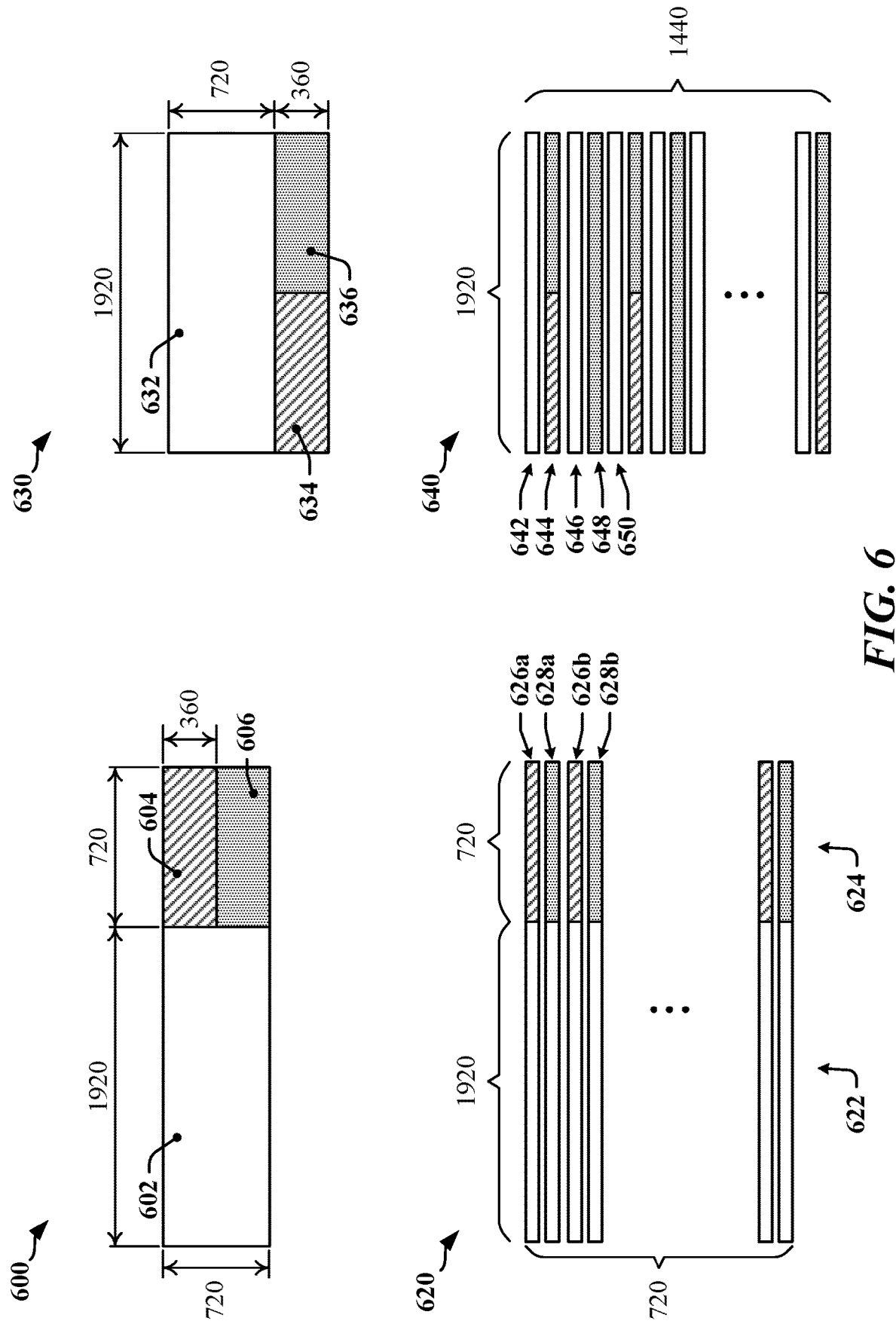
FIGS. 6 and 7 illustrate example ways to partition a display frame when a display port drives a plurality of asymmetrical display devices.

FIG. 6 illustrates example ways to organize video data when a display port is configured to drive plurality of asymmetrical display devices. For example, assume that a video controller is configured to drive first and second asymmetrical display devices over a single display port. Generally, the video data received and/or generated by the video controller may include first and second frames for display at the first and second display devices, respectively. The video controller may be configured to provide a packed frame (explained further below) to the first and second display devices through the single display port that is coupled to both the first and second display devices over a communication link.

In FIG. 6, the first display device (and therefore the first frame) is assumed to have a horizontal resolution of 1920 and a vertical resolution of 720, and the second display device (and therefore the second frame) assumed to have a horizontal resolution of 720 and a vertical resolution of 360. In FIG. 6, packed frames resulting from two packing schemes are illustrated. A frame generator of the video controller may generate a packed frame 600 utilizing a side-by-side packing scheme. The frame generator may generate the packed frame 630 utilizing a top-to-bottom packing scheme.

Before proceeding further, the following should be noted. Whether the side-by-side packing scheme or the top-to-bottom packing scheme is used may be completely independent of how the display devices themselves are arranged physically. As an example, the side-by-side packing scheme may be used even if the first and second display devices themselves are not arranged side-by-side. Similarly, the top-to-bottom packing scheme may be used even if the first and second display devices themselves are not arranged top-to-bottom. In short, the physical arrangements of the asymmetrical display devices themselves need not dictate which packing scheme is used.

The side-by-side packed frame 600 will be discussed initially. As seen, the packed frame 600 may include a first frame 602 (for display at the first display device) and a second frame 604 (for display at the second display device). The packed frame 600 generated by the frame generator may also include a padded frame 606. For ease of reference, Hpacked, H1, H2 and Hpadded will be used to represent the horizontal resolutions of the packed frame, the first frame, the second frame and the padded frame respectively. Similarly, Vpacked, V1, V2 and Vpadded will be used to represent the respective vertical resolutions.

Recall that in FIG. 6, the following are assumed: H1=1920, V1=720, H2=720, and V2=360. It should be emphasized that these are just example resolutions, and should not be taken to be limiting. Then the following observations may be made regarding the side-by-side packed frame 600 on the assumption that the vertical resolution of the first display device is greater than that of the second display device (e.g., V1>V2):

The vertical resolution of the padded frame 606 is the difference in the vertical resolutions of the first and second frames, i.e., Vpadded=V1−V2=360;

The horizontal resolution of the padded frame 606 is equal to the horizontal resolution of the frame with the lower vertical resolution, i.e., Hpadded=H2=720;

The vertical resolution of the packed frame 600 is equal to the vertical resolution of the frame with the higher vertical resolution, i.e., Vpacked=V1=720;

The horizontal resolution of the packed frame 600 is sum of the horizontal resolutions of the first and second frames, i.e., Hpacked=H1+H2=2640.

Each of the packed frame 600, the first frame 602, the second frame 604 and the padded frame 606 may be may be organized in scanlines, in which each scanline represents a single row of pixels of that frame. That is, the packed frame 600 may comprise a set of packed scanlines, the first frame 602 may comprise a set of first scanlines, the second frame 604 may comprise a set of second scanlines, and the padded frame 606 may comprise a set of padded scanlines.

As seen, the packed frame 600 may include the first frame 602, the second frame 604 and the padded frame 606. Therefore, each packed scanline (i.e., each row) of the packed frame 600 may include various combinations of the first scanlines, the second scanlines, and the padded scanlines. For example, for the first 360 rows, each packed scanline can be a combination of one first scanline (from the first frame 602) and one second scanline (from the second frame 604). For the subsequent 360 rows, each packed scanline can be a combination of one first scanline (from the first frame 602) and one padded scanline (from the padded frame 606).

Then in a perspective, the set of packed scanlines of the packed frame 600 may be viewed as comprising a first packed scanline subset (e.g., corresponding to rows 1-360) and a second packed scanline subset (e.g., corresponding to rows 361-720). Each packed scanline of the first packed scanline subset may comprise one first scanline from the set of first scanlines and one second scanline from the set of second scanlines. Also, each packed scanline from the second packed scanline subset may comprise one first scanline from the set of first scanlines and one padded scanline from the set of padded scanlines.

Since the packed frame 600 is larger than the first and second frames 602, 604, the data of the packed frame 600 should be transmitted at rate that is faster than the display data rates at the display devices. That is, if the first and second display data rates respectively represent the display data rates at the first and second display devices, then the packed frame transmission rate should be greater than the first display data rate, and also should be greater than the second display data rate.

Although related, a display device's display data rate should be distinguished from its display frame rate. For example, the device's display data rate may be the amount of data per frame of the device multiplied by the device's display frame rate. Thus, even if the display frame rates of the first and second devices are the same (e.g., 60 Hz), the first and second display data rates may be different if amount of data per frame for the first and second devices are different. If the amount of data per frame are the same, the first and second display data rates may be different if their respective display frame rates are different.

If the packed frame 600 is transmitted as is, then a receiver (e.g., at the first and/or second display devices) may be required to employ a frame buffer sufficient to buffer the entire packed frame 600, e.g., frame buffer large enough to hold Hpacked, Vpacked amount of data. This can represent a significant cost burden.

However, when there is an integer relationship between the vertical resolutions of the first and second frames, e.g., when m*V1=n*V2 and m and n are integers, the buffering requirements at the receiver side can be significantly reduced. In this particular example, the vertical resolution ratio n:m of the first and second frames is 2:1 (1*720=2*360). In this instance, the packed scanlines of the packed frame 600 may be interleaved to arrive at a packed frame 620. For example, the packed scanlines of the first packed scanline subset may be interleaved with the packed scanlines of the second packed scanline subset. In this particular instance, the packed frame 620 may be generated by inserting a scanline 626a from the first packed scanline subset, followed by inserting a scanline 628b from the second packed scanline subset, which is then followed by inserting another scanline 626b from the first packed scanline subset, and so on. By interleaving the packed scanlines, the frame buffering requirement at the receiver side, i.e., at the first and/or the second display devices, can be less than the entirety of the packed frame 600 or 620. For example, at the receiver side, a two-scanline buffer can be sufficient, which represents a significant reduction in buffering requirements.

Other vertical resolution ratios are possible. For example, in the packed frame 700 of FIG. 7, the first frame 702 is assumed to have resolutions H1=800, V1=480, and the second frame 704 is assumed to have resolutions H2=1920, V2=360 (V1>V2). This results in the padded frame 706 with resolutions Hpadded=H2=1920, Vpadded=V1−V2=120. Also, the packed frame 700 may have resolutions Hpacked=H1+H2=2720, Vpacked=V1=480.

In the packed frame 700, the vertical resolution ratio is 4:3, i.e., there is an integer relationship in the vertical resolutions. As a result, the buffering requirement at the receiver can be less than the entirety of the frame 700. For example, a four-line scan buffer may be sufficient. In this instance, a packed frame 720 may be generated by interleaving the packed scanlines of the first packed scanline subset (corresponding to rows 1-360 of the packed frame 720) with the packed scanlines of the second packed scanline subset (corresponding to rows 361-480). For example, three scanlines 726 from the first packed scanline subset may be interleaved with one scanline 728 from the second packed scanline subset.

Figure 7:
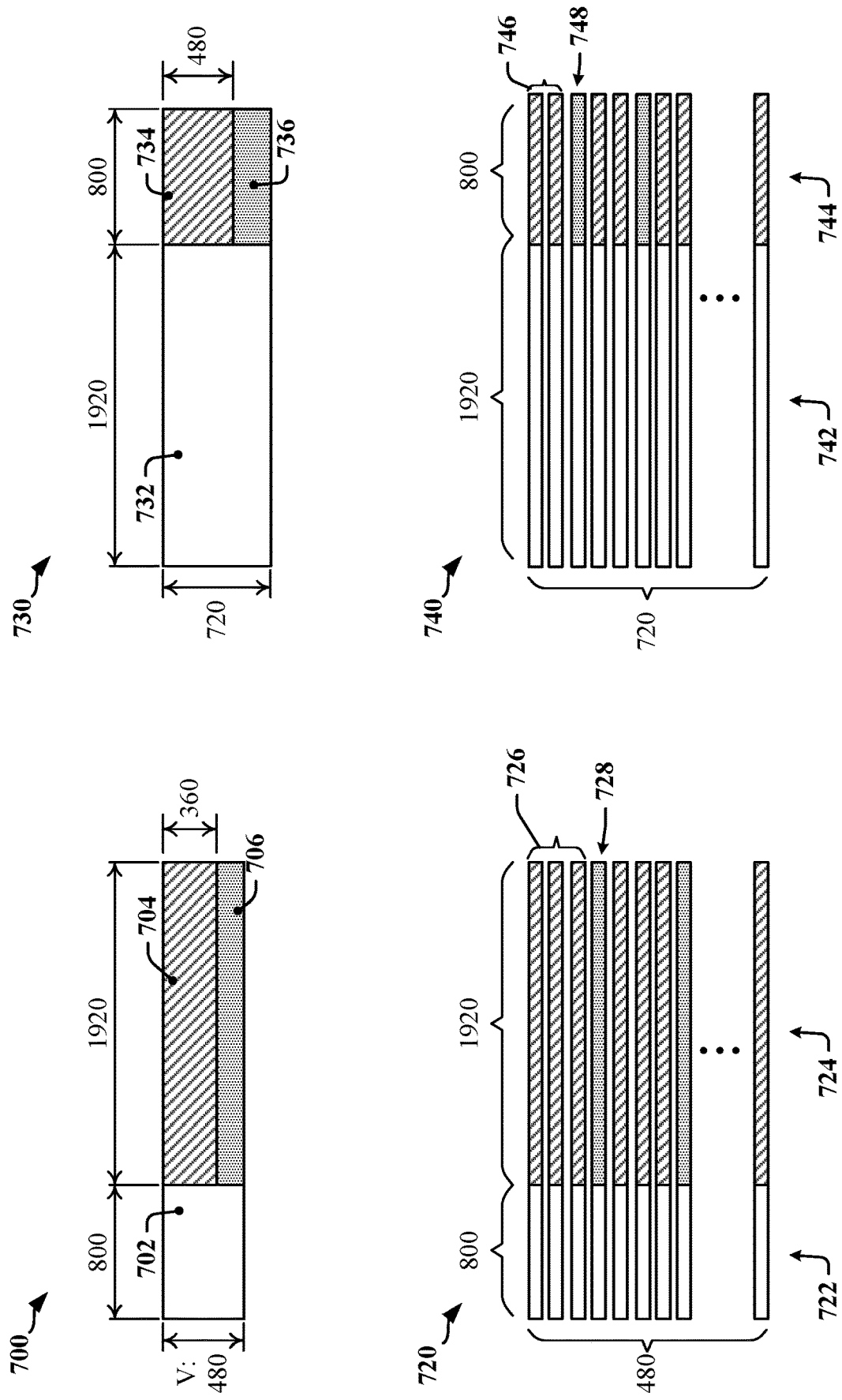

FIG. 7 also illustrates another example of the side-by-side packed frame 730 with a vertical resolution ratio of 3:2. In this instance, a three-line buffer at the receiver may be sufficient as seen with the interleaved frame 740. Side-by-side packing can minimize the buffer size in a downstream receiver to two line buffers (e.g., in the case of packed frame 600). Side-by-side packing may expend limited display resources in the video controller when, for example, the internal line buffer is limited to a maximum combined horizontal resolution width (H1+H2) such as 2560 pixels.

Top-to-bottom packing scheme will now be discussed. Referring back to FIG. 6, a packed frame 630 may be generated using top-to-bottom packing scheme. As seen, the packed frame 630 may comprise a first frame 632 with the same dimensions, i.e., resolutions, as the first frame 602 (H1=1920, V1=720), and a second frame 634 with the same dimensions as the second frame 604 (H2=720, V2=360). A padded frame 636 may be generated with resolutions Hpadded=H1−H2, Vpadded=V2. More generally, when H1>H2, Hpadded=H1−H2, Vpadded=V1, and when H1<H2, Hpadded=H2−H1, Vpadded=V2. The width of the packed frame 630 may be equal to the larger width of the first and second frames (Hpacked=max(H1, H2)), and depth may be the sum of the depths of the first and second frames (Vpacked=V1+V2). While not shown, in some instances, the depth of the packed frame 630 may be an integer multiple the depth of the larger depth (e.g., Vpacked=2V1).

The top-to-bottom packing can be used for packing two constituent frames which have widths that are equal value (e.g. H1=H2=2560). Top-to-bottom packing may require a full frame buffer in the downstream receiver, which can add significant cost to the manufacturer of the receiver. One compromise approach to top-to-bottom packing is to use line interleave packing 420. When interleaving is employed for asymmetrical display devices where, padding may be used for both top-to-bottom packing and side-by-side packing to equalize the effective vertical resolutions of the display devices.

For both the side-by-side and the top-to-bottom packing schemes, the padded scanlines in the set of padded scanlines (e.g., of the padded frame 606, 636, 706, 736) may be selected according to application. The pixel values in the padded scanlines may be set to any value. In one example, the bits of each pixel values in the padded scanline may be set to binary 0, or set to binary 1. In some instances, the padded scanline may be set to produce a desired a signal on the communication link when the scanline is transmitted. For example, the signal may be produced to minimize electromagnetic interference (EMI) effects, and/or to restore a direct current (DC) balance on the communication link. In another example the signal may be produced based on a signal transmitted on a neighboring wire or communication link, and may operate to cancel EMI or other deleterious effect of the signal transmitted on the neighboring wire or communication link. In another example the signal may be produced to enable synchronization of a clock in the receiver. In some instances, the padded scanline may be selected to have a bit pattern that may enable a receiver to recognize the padded scanline In some instances, the padded scanline may be generated as a pseudorandom sequence. In some instances, the padded scanline may be generated using any chosen or desired sequence of data, such as hexadecimal values "AAAA5555," etc.

According to certain aspects, a packing scheme may be selected that simplifies the unpacking procedure at the receiver. At the transmitter, packing frames for two or more display devices for output on a single display port can be relatively easy. A packing scheme may be configured that enables the receiver to unpack data without the need of large buffers. In the example of two display devices that are configured for a 60 Hz frame rate, the packed frame may be output at the equivalent of 120 Hz. Each display device expects to process data received at 60 Hz for 60 Hz rendering. According to certain aspects disclosed herein, the packing scheme can be selected in consideration of the limitations of a downstream receiver.

According to certain aspects, the packing scheme may be selected from a set of preconfigured schemes maintained by a processing circuit. For example, in an automotive implementation, display resolutions are typically known in advance, and may be determined by make, model, trim line and options installed in a vehicle. The appropriate display parameters can be loaded and maintained in look-up tables (LUTs) provided in storage that is accessible to the automotive processor. An identical platform (including an identical automotive processor SoC) may be used in multiple makes, models and trim lines, and display parameters applicable to such platforms may be stored in the LUTs. Additional display parameters and resolutions may be maintained in the LUTs, and the automotive processor may be configured to determine which display devices and configurations of display devices are employed in a given vehicle or model of vehicle. In one example, the automotive processor may interrogate the display devices, or central configuration resource to determine the type of display devices employed in the vehicle. In some instances, the automotive processor may read configuration registers in the display devices.

The display parameters stored in the LUTs may include frame configurations used to configure a packing scheme, including the packing schemes resulting in packed frames 600, 620, 630, 640, 700, 720, 730, 740 illustrated in FIGS. 6 and 7. The LUTs may include display parameters that define the locations of packed scanlines that include the padded scanlines. For example, when a packing scheme is configured to generate the packed frame 600, the display parameters may indicate that the padded scanlines occupy last 720 horizontal positions of the last 360 packed scanlines. As another example, for the interleaved packed frame 620, the display parameters may indicate that the padded scanlines occupy last 720 horizontal positions of every other packed scanline.

Some of the packed scanlines may include display parameters in addition to the padded scanlines, and the display parameters may indicate the location of the padded scanlines in these packed scanlines In some implementations, the display parameters may explicitly specify the locations of packed scanlines that include the padded scanlines. For example, the display parameters may include scanline numbers where the padded scanlines are included in the packed frame (e.g., rows 361-720 for packed frame 600).

In some implementations, the display parameters may specify the relative location of the packed scanlines that include the padded scanlines. For example, the display parameters may include the number of packed scanlines that do not include the padded scanlines (e.g., 360 for packed frame 600) preceding each packed scanline does include the padded scanline. The locations of the packed scanlines that do include the padded scanlines may be selected based on any number application-specific criteria.

In some instances, the packed scanlines that do include the padded scanlines may be aggregated to some degree, when one or more receiving devices have sufficient line buffers to supply data to the video controller at the specified display clock rate. That is, two or more packed scanlines may be provided sequentially in the packed frame. In one example, the packed scanlines that include the padded scanlines may be located adjacent to horizontal or vertical blanking zones in the frame.

The display parameters may specify the values of pixels used in the padded scanlines, and/or a set of pixel values that may be used in a padded scanline In one example, a set of pixel values may be repeated as needed to populate the padded frame in the packed frame. As disclosed herein, the values of pixels used in the padded scanlines may be selected to reduce EMI, quiesce one or more wires of the communication link and/or to optimize certain characteristics of the communication link, decoding logic in a receiving video controller, and for other application-specific reasons. For example, a wire of the communication link that is consistently driven to a voltage state may suffer from increased transition times when the wire is driven to a different voltage state, and a quiescent alternating pattern may produce a common mode voltage in the wire that optimizes transition times. In some implementations, the values of pixels used may vary with the display formats associated with the packed frame. In some implementations, the values of pixels used may be dynamically modified including, for example, when one or more display devices transition between a powered-on and a powered-off state. In some implementations, the packing scheme may be modified when one or more display devices transition between the powered-on and the powered-off state.

Figure 8:
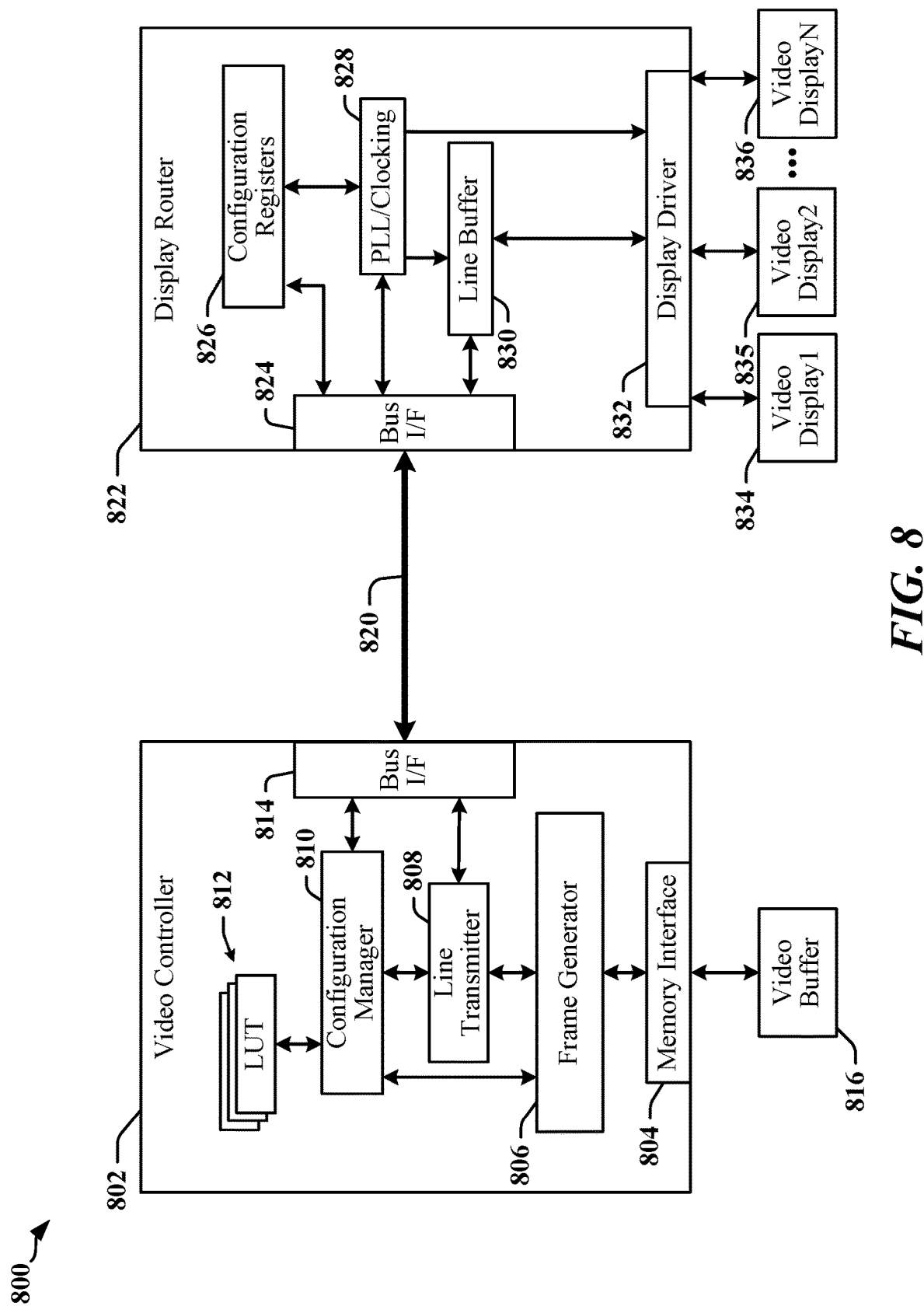
FIG. 8 illustrates an example of a display system.

FIG. 8 illustrates an example of a display system 800 adapted in accordance with certain aspects disclosed herein. For example, the display system 800 may be deployed in an automotive setting. The display system 800 may include a video controller 802, a display controller 822 and a communication link 820 coupling the video controller 802 and the display controller 822.

The video controller 802 may be embodied in an SoC that implements a processing circuit. The video controller 802 may access video data from a video buffer 816 using a memory interface 804. In some instances, the video controller 802 may generate the video data. The video data may be provided to a frame generator 806 configured to implement one or more packing schemes in accordance with certain aspects disclosed herein, i.e., the frame generator 806 may be configured to generate the packed frames.

The format of packed frames generated by the frame generator 806 may be determined by configuration information provided by a configuration manager 810. The configuration manager 810 may determine the types, numbers and operational characteristics of one or more display devices to driven through a single display port (implemented here in the bus interface 814). The configuration manager 810 may access look-up tables (LUTs 812) to obtain parameters used to configure the frame generator 806, a scanline transmitter 808 and/or the bus interface 814. The parameters may determine the number of pixels per packed scanline (e.g., Hpacked), the number of padded pixels per packed scanline (e.g., Hpadded), and the number of packed scanlines per packed frame (e.g., Vpacked). The parameters may determine the location of each padded scanline, and may determine the content of the padded scanlines. The parameters may be used to configure clock rates, buffer sizes and sequencing logic used to generate and transmit the packed frames.

The display controller 822 may be collocated with two or more video display devices 834, 835 . . . 836 and may be coupled to a single display port. A bus interface 824 may receive the packed frames from the video controller 802, and may provide the packed scanlines of the packed frame to the line buffers 830. The line buffers 830 may be configured or be operated to ignore certain scanlines and/or certain pixel regions in the packed scanlines In other words, the line buffers 830 may be configured for filtering/extracting. In one example, the line buffers 830 may be controlled by a clocking circuit 828 that provides gating and sampling signals that determine which packed scanlines and/or pixels are to be captured or otherwise extracted. The clocking circuit 828 may generate the gating and sampling signals based on configuration information maintained in one or more configuration registers 826. The configuration registers 826 may be initialized with default operating parameters during manufacture. In some instances, the video controller 802 may load or update the configuration registers 826 to accommodate the packing scheme used for the configuration of display devices. The line buffers 830 may provide display data to a display driver 832 that provides properly formatted data to the display devices 834, 835 . . . 836.

Locations of padded scanlines may be maintained by the video controller 802 in a mapping table that is shared with the display controller 822. In some implementations, the video controller 802, or a processing circuit associated with the video controller 802 may program configuration registers 826 in the display controller 822 that identify locations of the padded scanlines. The programmed registers may explicitly identify the locations of the padded scanlines, and/or may include counter values or other parameters used to configure the clocking circuit 828. In some implementations, the complexity of the video controller 802 may be reduced when the video controller 802 programs configuration registers 826 in the display controller 822.

The location of the packed scanlines that include the padded scanlines may be determined based on a pattern configured for a packing scheme. The pattern may be generated or selected based on various factors such as the number of display devices and the display resolutions of the display devices to be supported using the packed frame. In one example, the resolution of each display device may be expressed in a combination of a number of scanlines (S) and a number of padded scanlines lines (P) needed to match the maximum resolution (i.e., M scanlines) of the display devices supported by the packed frame. For any two display devices, the number of padded scanlines to be inserted in the data associated with the lower resolution display may be expressed as:

$$P_{inserted} = P_{higher\_res} - P_{lower\_res}$$

and the maximum spacing of the padded scan lines may be determined as:

$$Spacing_{Max} = \frac{S_{lower\_res} + P_{inserted}}{P_{inserted}}$$

The pattern for the packing scheme may be configured based on maximum spacing of the padded scanlines, and the locations of the padded scanlines maybe communicated to the frame generator 806, and may be further used to configure the clocking circuit 828 of the display controller 822.

The LUTs 812 may be configured during manufacture, during maintenance, or in response to software updates provided to the video controller 802. The video controller 802 may update the configuration registers 826 in the display controller 822 that is associated with two or more display devices 834, 835 . . . 836 after the LUTs 812 have been reconfigured or updated. In some instances, the configuration registers 826 in the display controller 822 may be configured during manufacture, maintenance, or by another protocol defined for the display controller 822.

Figure 9:
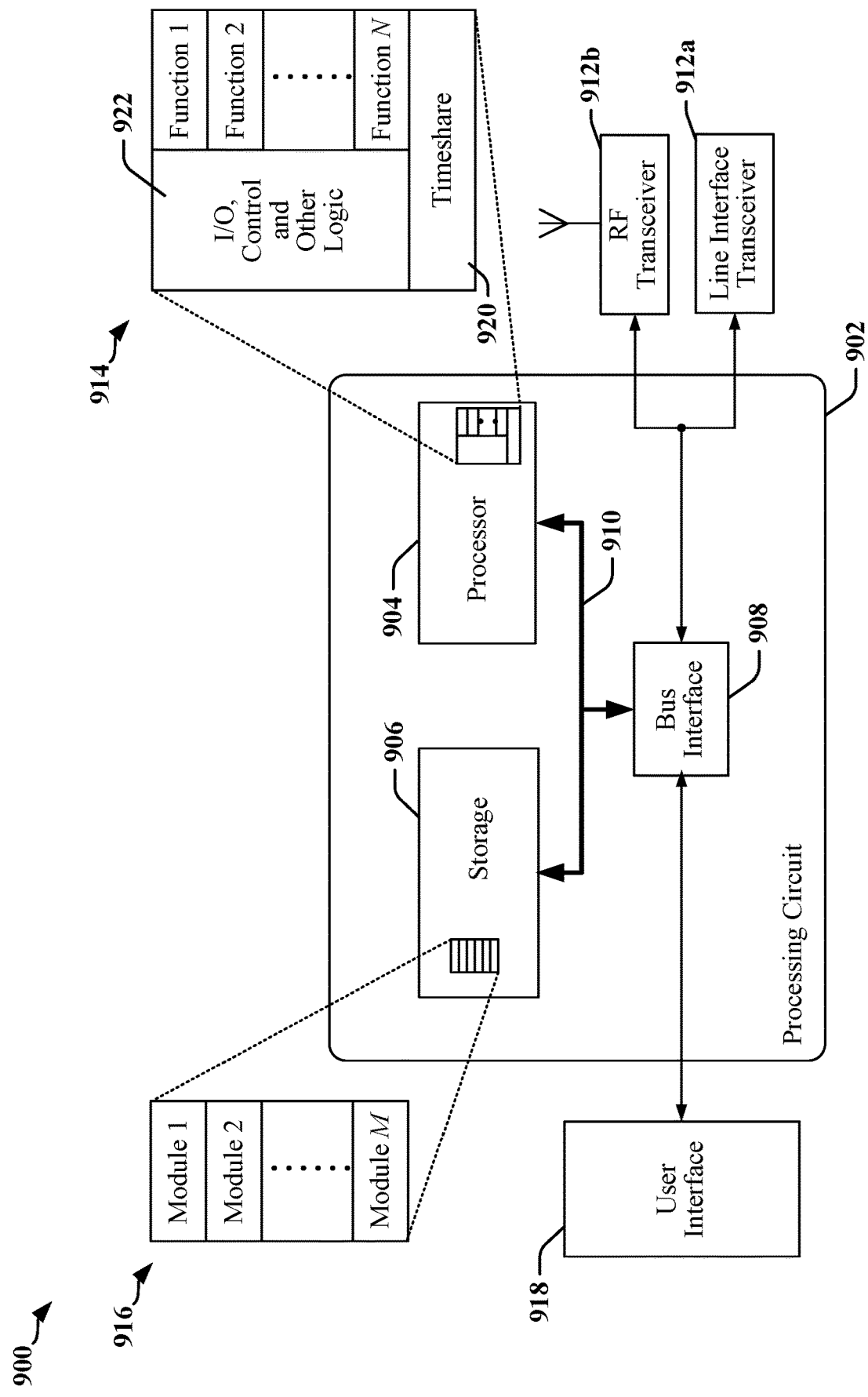
FIG. 9 illustrates an example of an apparatus configured to employ a state machine used to control a video processor.

FIG. 9 is a diagram illustrating an example of a hardware implementation for an apparatus 900 employing a state machine that may be used to configure and control a video processor. In some examples, the apparatus 900 may be embodied in an SoC that performs the functions of an automotive processor. In some examples, the apparatus 900 may perform one or more functions disclosed herein. In accordance with various aspects of the disclosure, an element, or any portion of an element, or any combination of elements as disclosed herein may be implemented using a processing circuit 902.

The processing circuit 902 may include one or more processors 904 that are controlled by some combination of hardware and software modules. Examples of the processor(s) 904 includes microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The processor(s) 904 may include one or more specialized processors that perform specific functions, and that may be configured, augmented or controlled by one or more software modules 916. The processor(s) 904 may be configured through a combination of software modules 916 loaded during initialization, and further configured by loading or unloading one or more software modules 916 during operation.

In the illustrated example, the processing circuit 902 may be implemented with a bus architecture, represented generally by the bus 910. The bus 910 may include any number of interconnecting buses and bridges depending on the specific application of the processing circuit 902 and the overall design constraints. The bus 910 may link together various circuits including the processor(s) 904 and storage 906. The storage 906 may include memory devices and mass storage devices, and may be referred to herein as computer-readable media and/or processor-readable media. The bus 910 may also link various other circuits such as timing sources, timers, peripherals, voltage regulators, and power management circuits. A bus interface 908 may provide an interface between the bus 910 and one or more transceivers 912a, 912b. A transceiver 912a, 912b may be provided for each networking technology supported by the processing circuit. In some instances, multiple networking technologies may share some or all of the circuitry or processing modules found in a transceiver 912a, 912b. Each transceiver 912a, 912b may provide means for communicating with various other apparatus over a transmission medium. In one example, the transceiver 912a may be used to couple the apparatus 900 to a multi-wire bus. In another example, the transceiver 912b may be used to connect the apparatus 900 to a radio access network. Depending upon the nature of the apparatus 900, a user interface 918 (e.g., keypad, display, speaker, microphone, joystick) may also be provided, and may be communicatively coupled to the bus 910 directly or through the bus interface 908.

The processor(s) 904 may be configured for managing the bus 910 and for general processing that may include the execution of software stored in a computer-readable medium that may include the storage 906. In this respect, the processing circuit 902, including the processor(s) 904, may be used to implement any of the methods, functions and techniques disclosed herein. The storage 906 may be used for storing data that is manipulated by the processor(s) 904 when executing software, and the software may be configured to implement any one of the methods disclosed herein.

The processor(s) 904 may execute software, which may be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 906 or in an external computer-readable medium. The external computer-readable medium and/or storage 906 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 906 may also include, by way of example, a carrier wave, a transmission line, and any other suitable medium for transmitting software and/or instructions that may be accessed and read by a computer. Computer-readable medium and/or the storage 906 may reside in the processing circuit 902, in the processor(s) 904, external to the processing circuit 902, or be distributed across multiple entities including the processing circuit 902. The computer-readable medium and/or storage 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 906 may maintain software maintained and/or organized in loadable code segments, modules, applications, programs, etc., which may be referred to herein as software modules 916. Each of the software modules 916 may include instructions and data that, when installed or loaded on the processing circuit 902 and executed by the processor(s) 904, contribute to a run-time image 914 that controls the operation of the processor(s) 904. When executed, certain instructions may cause the processing circuit 902 to perform functions in accordance with certain methods, algorithms and processes described herein.

Some or all of the software modules 916 may be loaded during initialization of the processing circuit 902, and these software modules 916 may configure the processing circuit 902 to enable performance of the various functions disclosed herein. For example, some software modules 916 may configure internal devices and/or logic circuits of the processor 904, and may manage access to external devices such as the transceiver 912a, 912b, the bus interface 908, the user interface 918, timers, mathematical coprocessors, and so on. The software modules 916 may include a control program and/or an operating system that interacts with interrupt handlers and device drivers, and that controls access to various resources provided by the processing circuit 902. The resources may include memory, processing time, access to the transceiver 912a, 912b, the user interface 918, and so on.

The processor(s) 904 of the processing circuit 902 may be multifunctional, whereby some of the software modules 916 are loaded and configured to perform different functions or different instances of the same function. The processor(s) 904 may additionally be configured to manage background tasks initiated in response to inputs from the user interface 918, the transceiver 912a, 912b and device drivers, for example. To support the performance of multiple functions, the processor(s) 904 may be configured to provide a multitasking environment, whereby each of a plurality of functions is implemented as a set of tasks serviced by the processor(s) 904 as needed or desired. In one example, the multitasking environment may be implemented using a timesharing program 920 that passes control of a processor 904 between different tasks, whereby each task returns control of the processor(s) 904 to the timesharing program 920 upon completion of any outstanding operations and/or in response to an input such as an interrupt. When a task has control of the processor(s) 904, the processing circuit is effectively specialized for the purposes addressed by the function associated with the controlling task. The timesharing program 920 may include an operating system, a main loop that transfers control on a round-robin basis, a function that allocates control of the processor(s) 904 in accordance with a prioritization of the functions, and/or an interrupt driven main loop that responds to external events by providing control of the processor(s) 904 to a handling function.

Figure 10:
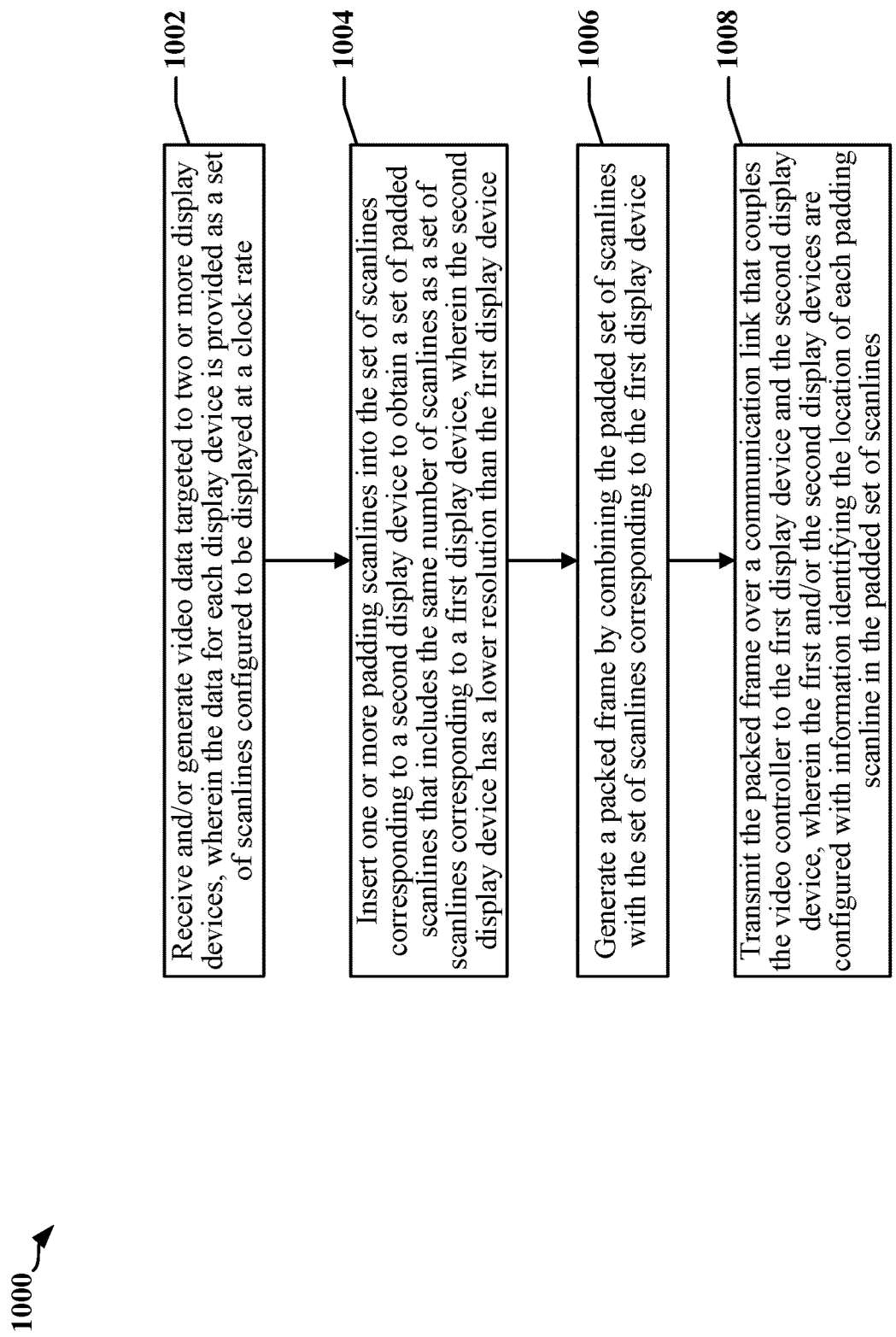
FIG. 10 illustrates a flowchart of an example method that may be performed in an apparatus that includes a video controller.

FIG. 10 illustrates a flowchart of an example method 1000 that may be performed in an apparatus, e.g., an IC device that includes a video controller such as the video controller 802. At block 1002, the video controller may generate and/or receive video data targeted to two or more display devices including first and second display devices in which the first device is assumed to have higher resolution. The data for each display may be provided as a set of scanlines configured to be displayed at a clock rate.

At block 1004, the video controller may insert one or more padded scanlines into the set of scanlines corresponding to the second display device to obtain a set of scanlines that includes the same number of scanlines as a set of scanlines corresponding to the first display device. For example, referring to the packed frame 600 in FIG. 6, the video controller may insert the padded frame 606 such that the number of second scan lines (of the second frame 604) and the number of padded scanlines (of the padded frame 606) corresponds to the number of first scanlines (of the first frame 602).

At block 1006, the video controller may generate a packed frame by combining the padded set of scanlines with the set of scanlines corresponding to the first display device. For example, in FIG. 6, the packed frame 600 may be generated by combining the padded frame 606 and the second frame 604 with the first frame 602.

In some examples, the packed frame may be generated by combining each scanline in the padded set of scanlines with a corresponding scanline in the set of scanlines corresponding to the first display device to obtain an enlarged scanline in the packed frame. Certain enlarged scanlines in the packed frame include padding values and pixel values associated with the second display device (e.g., see FIG. 6, frame 600). In some examples, the packed frame may be generated by alternating scanlines from the padded set of scanlines with scanlines from the set of scanlines corresponding to the second display device to obtain an interleaved packed frame (e.g., see FIG. 6, frame 620).

At block 1008, the video controller may transmit the packed frame over a single communication link that couples the video controller to the first display device and the second display device. The first and/or the second display device may be configured with information identifying the location of each padded scanline in the padded set of scanlines.

Figure 11:
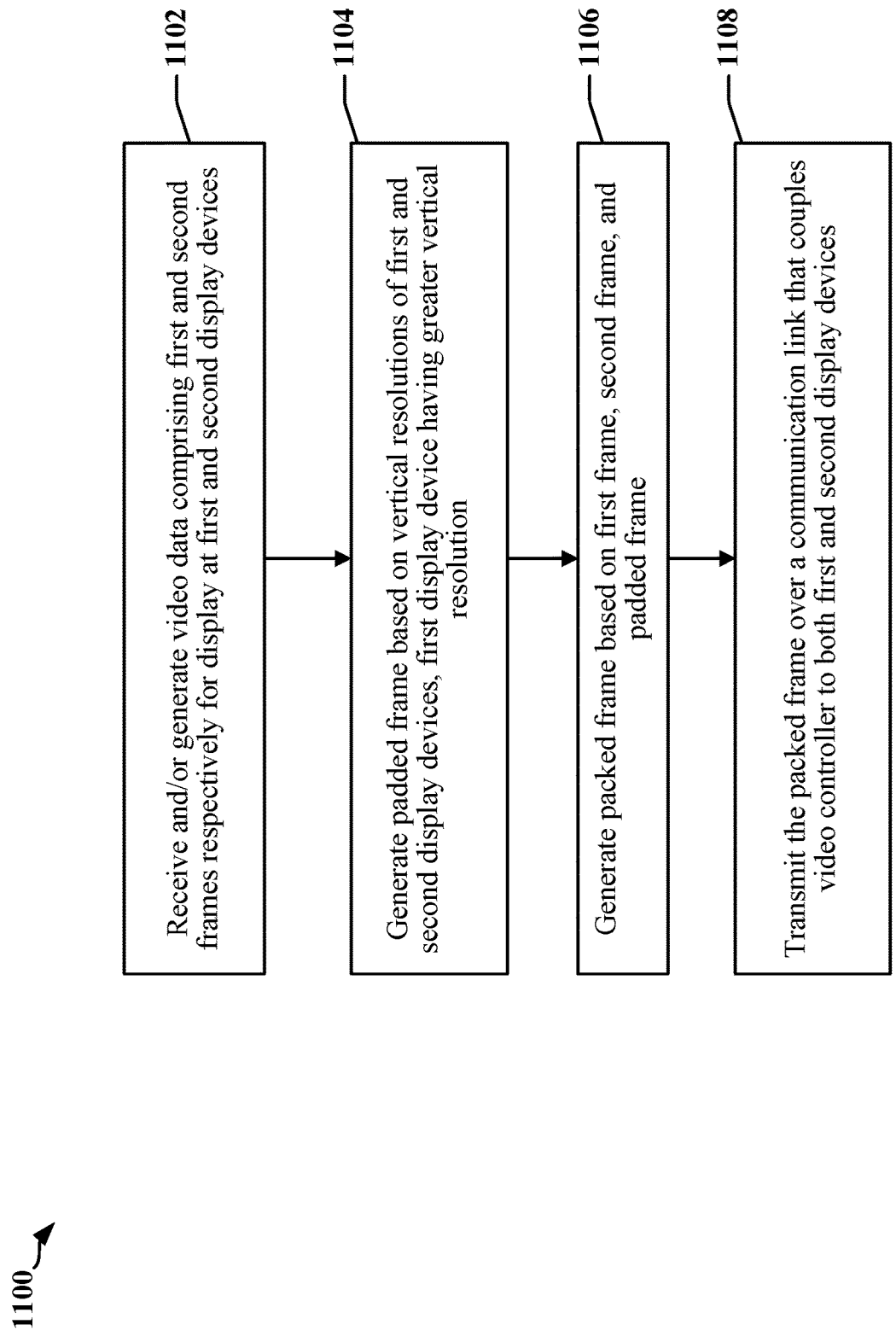
FIG. 11 illustrates a flowchart of another example method that may be performed in an apparatus that includes a video controller.

FIG. 11 illustrates a flowchart of another example method 1100 that may be performed in an apparatus that includes a video controller (e.g., the video controller 802). At block 1102, a frame generator (e.g., the frame generator 806) of the video controller may receive and/or generate video data targeted to a plurality of display devices. For example, when the plurality of display devices include first and second display devices, the video data may comprise first and second frames (e.g., frames 602, 604, 702, 704, 732, 734) respectively for display at the first and second display devices. The video data for each display device may be provided as a set of scanlines. For example, the first frame (e.g., frames 602, 702, 732) may comprise a set of first scanlines and the second frame (e.g., frames 604, 704, 734) may comprise a set of second scan lines.

At block 1104, the frame generator may generate a padded frame (e.g., frames 606, 706, 736) based on resolutions of the display devices. For example, the padded frame may be generated based on the vertical resolutions of the first and second display devices. The vertical resolutions of the display devices may be different. For example, the vertical resolution of the first display device may be greater than that of the second display device. The padded frame may comprise a set of padded scanlines.

At block 1106, the frame generator may generate a packed frame (e.g., frames 600, 620, 700, 720, 730, 740) based on the video data and the padded frame. For example, the packed frame may be generated based on the first frame, the second frame, and the padded frame. The packed frame may comprise a set of packed scanlines. At block 1108, a display port (e.g., display port 814) may transmit the packed frame at a transmission rate to the plurality of display devices over a communication link (e.g., communication link 820). The communication link may be coupled to two or more display devices including the first and second display devices.

For both methods 1000 and 1100, a configuration manager (e.g., configuration manager 810) of the video controller may be configured to store configuration information in one or more registers (e.g., registers 826) of the first and/or the second display devices. The configuration information may identify the location of each padded scanline in the packed frame, i.e., locations of each padded scanline in the set of packed scanlines.

A display controller (e.g., display controller 822) of the first and/or the second display device may be configured to filter the packed scanlines at locations identified by the one or more registers as including the padded scanlines. The display controller may be configured to ignore portions of the packed scanlines at locations identified by the one or more registers as including the padded scanlines.

The configuration manager of the video controller may be configured to maintain information characterizing a plurality of display devices in a lookup table (e.g., LUT 812). The information characterizing the plurality of display devices may include information identifying resolutions of the plurality of display devices including the first and second display devices.

The configuration manager may be configured to maintain packing schemes for combinations of two or more display devices, and the frame generator may be configured to use a packing scheme associated with a combination of the first display device and the second display device to generate the packed frame. The packing scheme associated with the combination of the first display device and the second display device may identify the location of the padded scanlines in the packed frame.

In some examples, the padded scanlines may include fixed value pixel values. The fixed value pixel values may be selected to quiesce one or more wires of the communication link when the padded scanline is transmitted. In some examples, the padded scanlines may include pixel values configured to cause a signaling condition on one or more wires of the communication link. The signaling condition may minimize electromagnetic interference attributable to the communication link when the padded scanline is transmitted. The signaling condition may minimize power consumption of the communication link when the padded scanline is transmitted. The signaling condition may be used for synchronization by one or more devices coupled to the communication link.

Figure 12:
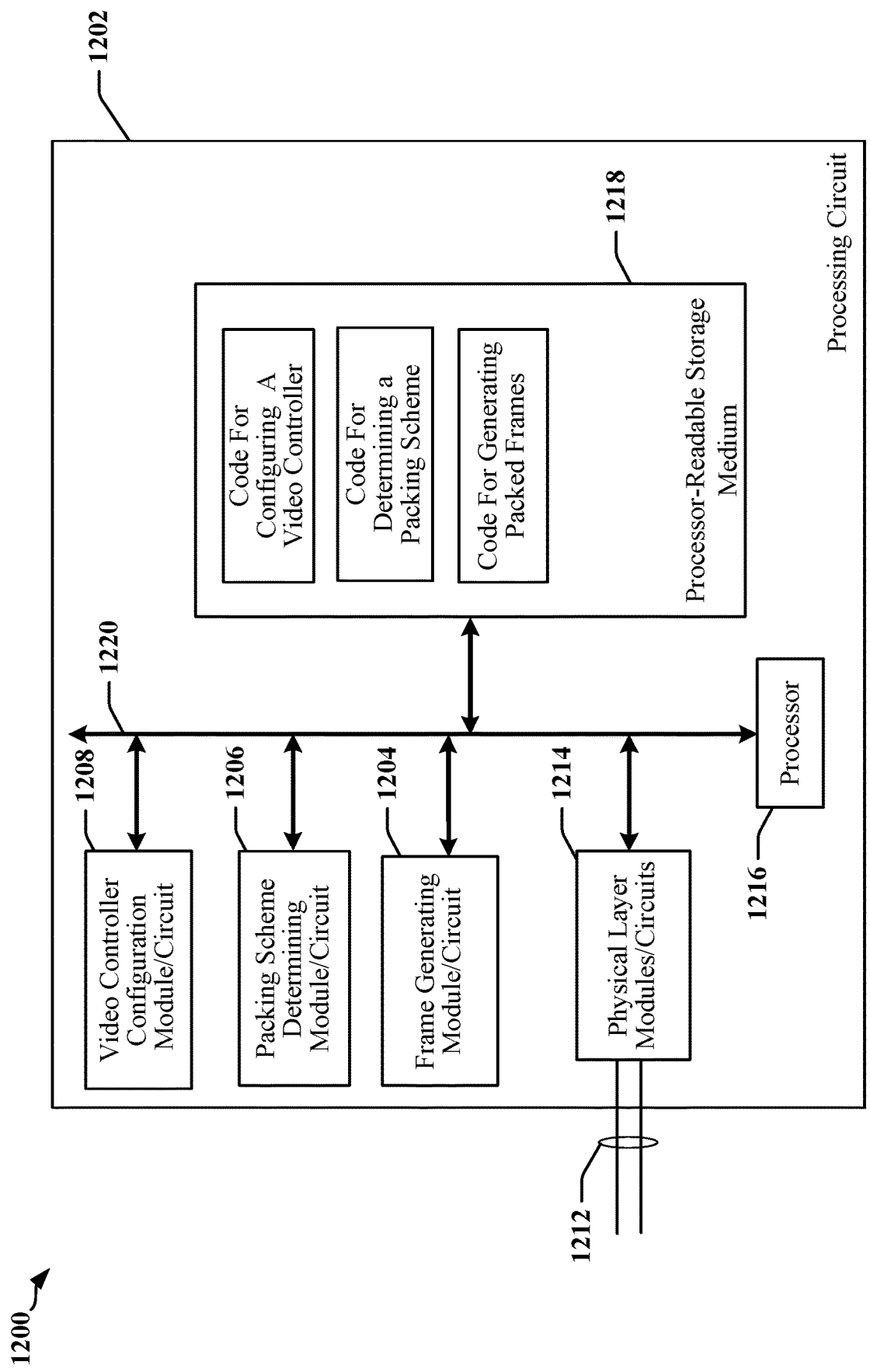
FIG. 12 illustrates a diagram showing an example hardware implementation of an apparatus that includes a video controller.

FIG. 12 is a diagram illustrating a simplified example of a hardware implementation for an apparatus 1200 employing a processing circuit 1202. The apparatus 1200 may implement a bridging circuit in accordance with certain aspects disclosed herein. The processing circuit may include a controller/processor 1216 that may include one or more microprocessors, microcontrollers, digital signal processors, sequencers and/or state machines. The processing circuit 1202 may be implemented with a bus architecture, represented generally by the bus 1220. The bus 1220 may include any number of interconnecting buses and bridges depending on the specific application of the processing circuit 1202 and the overall design constraints. The bus 1220 may link together various circuits including one or more processors and/or hardware modules, represented by the controller/processor 1216, the modules/circuits 1204, 1206 and 1208, and the processor-readable storage medium 1218. One or more physical layer module/circuits 1214 may be provided to support communications over a communication link 1212. The bus 1220 may also link various other circuits such as timing sources, peripherals, voltage regulators, and power management circuits.

The controller/processor 1216 may be responsible for general processing, including the execution of software, code and/or instructions stored on the processor-readable storage medium 1218. The processor-readable storage medium 1218 may include a non-transitory storage medium. The software, when executed by the controller/processor 1216, may cause the processing circuit 1202 to perform the various functions described supra for any particular apparatus. The processor-readable storage medium may be used for storing data that is manipulated by the controller/processor 1216 when executing software.

The processing circuit 1202 may further include one or more modules and/or circuits 1204, 1206 and 1208. The modules/circuits 1204, 1206 and 1208 may be software modules running in the controller/processor 1216, resident/stored in the processor-readable storage medium 1218, one or more hardware modules/circuits coupled to the controller/processor 1216, or some combination thereof. The modules/circuits 1204, 1206 and 1208 may include microcontroller instructions, state machine configuration parameters, or some combination thereof. The module/circuit 1208 may be configured to configure certain features and/or operations of a video controller, the module/circuit 1206 may be configured to pack sets of scanlines associated with asymmetrical display devices, and the module/circuit 1204 may be configured to generate packed frames that combine display data for two or more display devices.

In one example, the apparatus 1200 may include a video buffer, a communication interface (including physical layer modules and circuits 1214) configured to couple the apparatus 1200 to the communication link 1212, a look-up table, and a video controller. The processing circuit 1202 may be configured to perform the method 1000 and/or 1100 described above.

Figure 13:
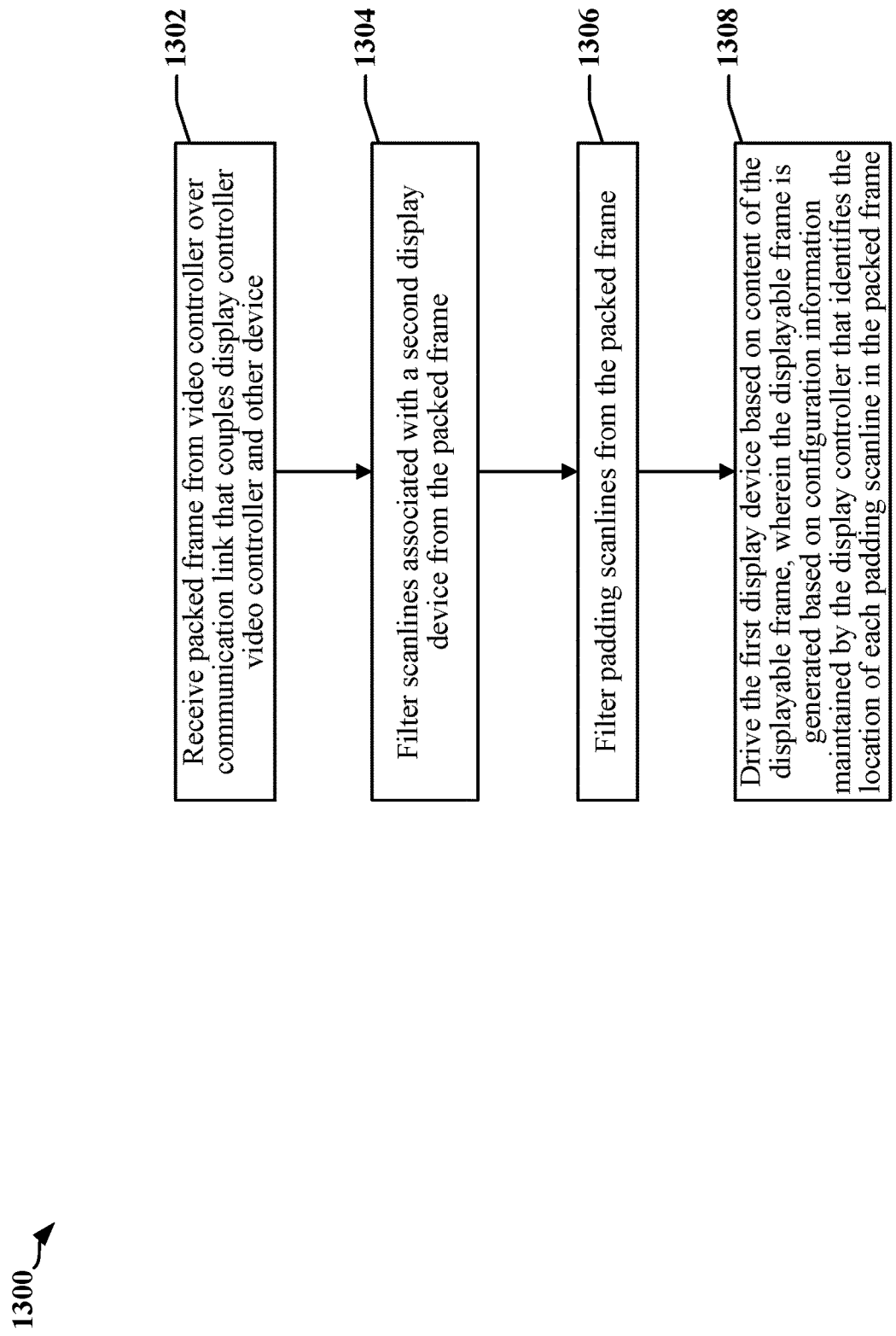
FIG. 13 illustrates a flowchart of an example method that may be performed in an apparatus that includes a display controller.

FIG. 13 is a flowchart of an example method 1300 that may be performed in an apparatus, e.g., an IC device that includes a display controller (e.g., display controller 822). At block 1302, the display controller may receive a packed frame (e.g., frames 600, 620, 700, 720, 730, 740) over a communication link (e.g., communication link 820) that couples the display controller to a video controller (e.g., video controller 802). The display controller may be a display controller of a first display device, and the communication link may also be coupled a second display device.

At block 1304, the display controller may filter scanlines associated with the second display device from the packed frame (e.g., filter frames 604, 704, 734). At block 1306, the display controller may filter the padded scanlines (e.g., filter frames 606, 706, 736) from the packed frame. At block 1308, the display controller may drive the first display device based on content of the displayable frame. The displayable frame, i.e., the first frame (e.g., frames 602, 702, 732) may be generated based on configuration information maintained by the display controller that identifies the location of each padded scanline in the packed frame.

In some examples, the configuration information identifies the location of scanlines associated with the first display device in the packed frame. The configuration information may identify the location of scanlines associated with the second display device in the packed frame. Scanlines associated with the second display device may be appended or prepended to scanlines associated with the first display device. Scanlines associated with the second display device are interleaved with scanlines associated with the first display device.

Figure 14:
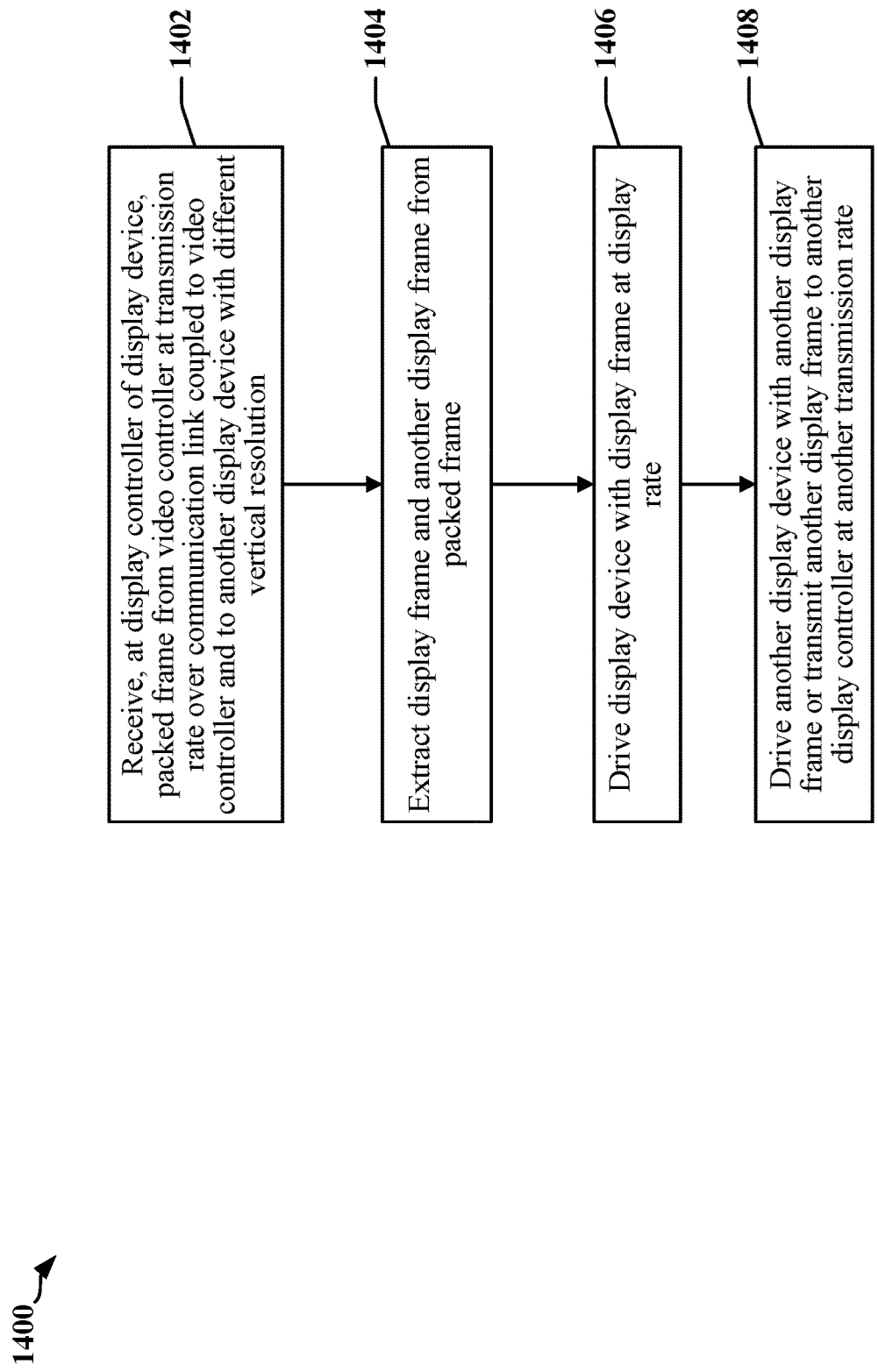
FIG. 14 illustrates a flowchart of another example method that may be performed in an apparatus that includes a display controller.

FIG. 14 is a flowchart of another example method 1400 that may be performed in an apparatus that includes a display controller (e.g., display controller 822). At block 1402, an interface port (e.g., bus interface 824) of the display controller of a display device may receive a packed frame (e.g., frames 606, 706, 736) from a video controller (e.g., video controller 802) over a communication link (e.g., communication link 820) at a transmission rate. The packed frame may comprise a set of packed scanlines.

In addition to the display device (e.g., video display 834), the communication link may also be coupled another display device (e.g., video display 835). The display device may be one of the first and second display devices, and the another display device may be the another of the first and second display devices. That is, the vertical resolution of the display device may be different than the vertical resolution of the another display device.

At block 1404, a frame filter (e.g., line buffer 830) may extract a display frame and extract another display frame. The display frame may be for display at the display device and may comprise a set of display scanlines. The another display frame may be for display at the another display device and may comprise a set of another display scanlines. For example, if the display device is the first display device, then the display frame may be the first frame (e.g., frames 602, 702, 732) and the another display frame may be the second frame (e.g., frames 604, 704, 734). On the other hand, if the display device is the second display device, then the display frame may be the second frame and the another display frame may be the first frame. The frame filter may extract the display frame by filtering the set of display scanlines from the set of packed scanlines. The frame filter may also extract the another display frame by filtering the set of another display scanlines from the set of packed scanlines.

Recall that the video controller may generate the packed frame based on the first frame, the second frame, and the padded frame. Also recall that the set of packed scanlines of the packed frame may comprise first and second packed scanline subsets. In the context of FIG. 14, each packed scanline of the first packed scanline subset may comprise one display scanline from the set of display scanlines and one another display scanline from the set of another display scanlines. Also, when the vertical resolution of the display device is greater than that of the another display device (e.g., when the display device is the first display device), each packed scanline of the second packed scanline subset may comprise one display scanline from the set of display scanlines and one padded scanline from the set of padded scanlines. When the vertical resolution of the display device is smaller than that of the another display device (e.g., when the display device is the second display device), each packed scanline of the second packed scanline subset may comprise one display scanline from the set of another display scanlines and one padded scanline from the set of padded scanlines.

Such configuration information may be stored in one or more registers (e.g., configuration registers 826). The configuration information may identify the padded frame (e.g., frames 606, 706, 736) within the packed frame. For example, the configuration information may identify the location of each padded scanline in the set of packed scanlines. The frame filter may extract the display frame (e.g., one of (602, 604), (702, 704), or (732, 734)) and the another display frame (e.g., other of (602, 604), (702, 704), or (732, 734)) based on the configuration information stored in the registers. For example, the frame filter may filter out or otherwise ignore the padded frame based on the configuration information when extracting the display frame and the another display frame. At block 1406, a display driver (e.g., display driver 832) may drive the display device (e.g., video display 834) with the display frame at a display data rate of the display device.

At block 1408, one of the following may occur. Recall that in FIG. 8, there can be multiple display devices 834, 835 . . . 836. That is, in one aspect, the display controller 822 of the display device may also be the display controller for the another display device (e.g., for both first and second display devices). In this instance, the display driver may drive the another display device with the another display frame at another display data rate. The display driver may comprise multiple physical drivers for driving each of the display devices. The transmission rate (the rate at which the interface port receives the packed frame from the video controller) may be greater than the display data rate and greater than the another display data rate. For example, the transmission rate may be equal to or higher than a sum of the display data rate and the another display data rate.

However, the another display device may be controlled separately by another display controller. Then at block 1408, the interface port may transmit the another display frame to the another display controller at another transmission rate over the communication link. The another transmission rate may correspond to the another display data rate. In this instance, the transmission rate may be greater than the display data rate and greater than the another transmission rate. For example, the transmission rate may be equal to or higher than a sum of the display data rate and the another transmission rate.

Figure 15:
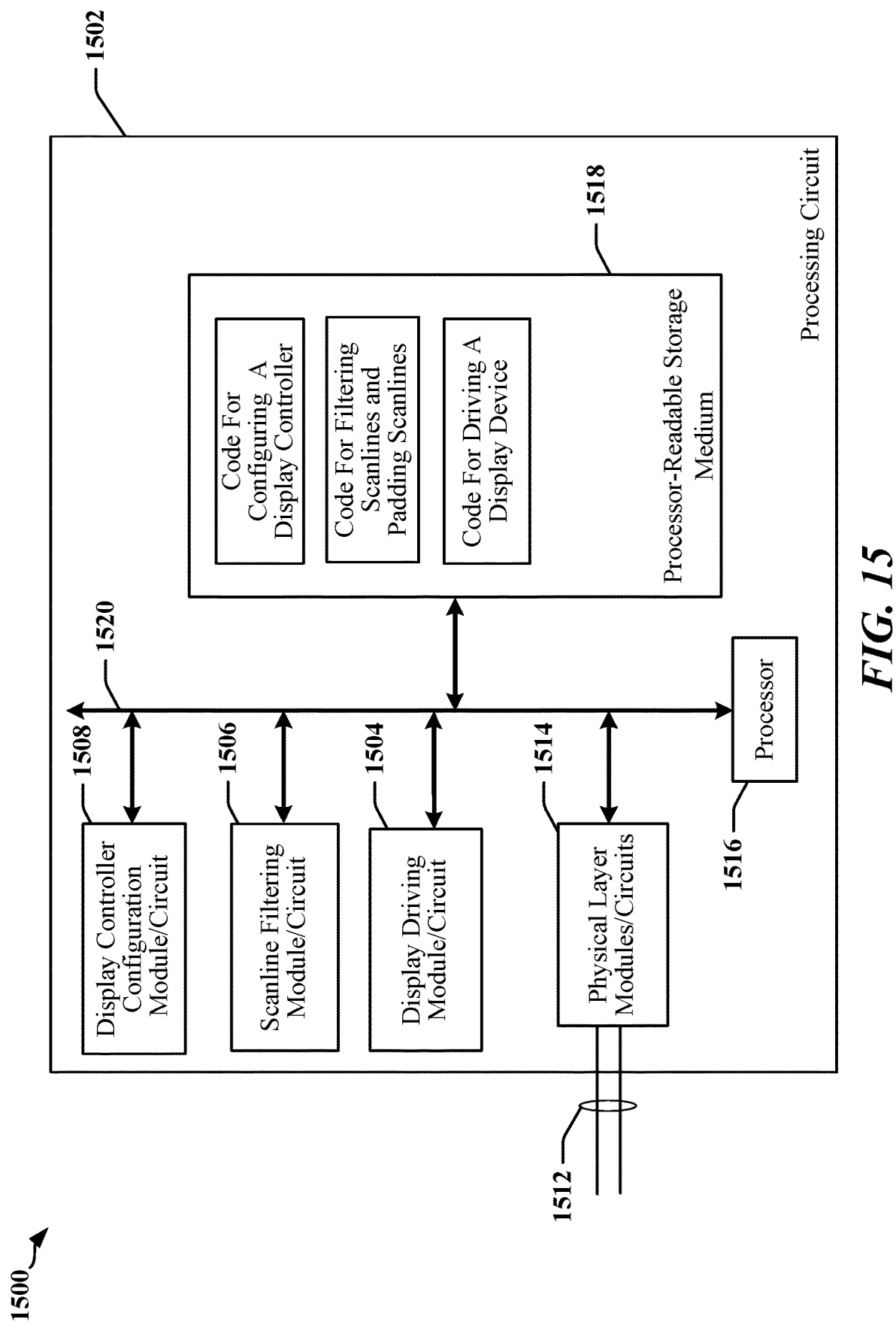
FIG. 15 illustrates a diagram showing an example hardware implementation of an apparatus that includes a display controller.

FIG. 15 is a diagram illustrating a simplified example of a hardware implementation for an apparatus 1500 employing a processing circuit 1502. The apparatus 1500 may implement a bridging circuit in accordance with certain aspects disclosed herein. The processing circuit typically has a controller/processor 1516 that may include one or more microprocessors, microcontrollers, digital signal processors, sequencers and/or state machines. The processing circuit 1502 may be implemented with a bus architecture, represented generally by the bus 1520. The bus 1520 may include any number of interconnecting buses and bridges depending on the specific application of the processing circuit 1502 and the overall design constraints. The bus 1520 may link together various circuits including one or more processors and/or hardware modules, represented by the controller/processor 1516, the modules and/or circuits 1504, 1506 and 1508, and the processor-readable storage medium 1518. One or more physical layer modules/circuits 1514 may be provided to support communications over a communication link 1512. The bus 1520 may also link various other circuits such as timing sources, peripherals, voltage regulators, and power management circuits, which are well known in the art, and therefore, will not be described any further.

The controller/processor 1516 may be responsible for general processing, including the execution of software, code and/or instructions stored on the processor-readable storage medium 1518. The processor-readable storage medium 1518 may include a non-transitory storage medium. The software, when executed by the controller/processor 1516, may cause the processing circuit 1502 to perform the various functions described supra for any particular apparatus. The processor-readable storage medium 1518 may be used for storing data that is manipulated by the controller/processor 1516 when executing software.

The processing circuit 1502 may further include one or more modules/circuits 1504, 1506 and 1508. The modules/circuits 1504, 1506 and 1508 may be software modules running in the controller/processor 1516, resident/stored in the processor-readable storage medium 1518, one or more hardware modules/circuits coupled to the controller/processor 1516, or some combination thereof. The modules/circuits 1504, 1506 and 1508 may include microcontroller instructions, state machine configuration parameters, or some combination thereof.

The module/circuit 1508 may be configured to configure certain features and/or operations of a display controller. For example, the module/circuit 1508 may maintain information of the padded frame including locations of the padded scanlines in the packed frame. The module/circuit 1506 may be configured to filter the packed frame to extract the display frame and/or the another display frame. The module/circuit 1504 may be configured to drive the display device with the display frame. The module/circuit 1504 may be configured to transmit the another display frame to the another display device.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithms described in connection with the examples disclosed herein may be implemented as electronic hardware, computer software, or combinations of both. To clearly illustrate this interchangeability of hardware and software, various illustrative components, blocks, modules, circuits, and methods have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled with the processor such that the processor can read information from, and write information to, the storage medium. In the alternative, the storage medium may be integral to the processor.

Accordingly, an aspect can include a computer-readable media embodying any of the devices described above. Accordingly, the scope of the disclosed subject matter is not limited to illustrated examples and any means for performing the functionality described herein are included.

While the foregoing disclosure shows illustrative examples, it should be noted that various changes and modifications could be made herein without departing from the scope of the disclosed subject matter as defined by the appended claims. The functions, processes and/or actions of the method claims in accordance with the examples described herein need not be performed in any particular order. Furthermore, although elements of the disclosed subject matter may be described or claimed in the singular, the plural is contemplated unless limitation to the singular is explicitly stated.

What is claimed is:

1. A video controller comprising:
a frame generator configured to:
receive and/or generate video data comprising first and second frames respectively for display at first and second display devices, the first frame comprising a set of first scanlines and the second frame comprising a set of second scanlines;
generate a padded frame based on vertical resolutions of the first and second display devices, the padded frame comprising a set of padded scanlines, and the vertical resolution of the first display device being greater than the vertical resolution of the second display device;
generate a packed frame based on the first frame, the second frame, and the padded frame, the packed frame comprising a set of packed scanlines; and
a display port configured to transmit the packed frame at a transmission rate to the first and second display devices over a communication link,
wherein the communication link is coupled to both the first and second display devices, and
wherein the set of padded scanlines includes scanlines other than duplicates of the set of first scanlines and the set of second scan lines.

2. The video controller of claim 1,
wherein the set of packed scanlines comprises first and second packed scanline subsets,
wherein each packed scanline of the first packed scanline subset comprises one first scanline from the set of first scanlines and one second scanline from the set of second scanlines, and
wherein each packed scanline of the second packed scanline subset comprises one first scanline from the set of first scanlines and one padded scanline from the set of padded scanlines.

3. The video controller of claim 2, wherein the frame generator is configured to generate the packed frame by interleaving the packed scanlines of the first packed scanline subset with the packed scanlines of the second packed scanline subset.

4. The video controller of claim 3, wherein the frame generator is configured to interleave the packed scanlines such that a frame buffering requirement at the first display device and/or the second display device is less than an entirety of the packed frame.

5. The video controller of claim 1,
wherein Hpacked=H1+H2 in which Hpacked represents a horizontal resolution of the packed frame, and H1 and H2 respectively represent horizontal resolutions of the first and second frames, and wherein Vpacked=V1 in which Vpacked represents a vertical resolution of the packed frame and V1 represents a vertical resolution of the first frame.

6. The video controller of claim 5, wherein Hpadded=H2 in which Hpadded represents a horizontal resolution of the padded frame, and wherein Vpadded=V1−V2 in which Vpadded represents a vertical resolution of the padded frame, and V2 represents a vertical resolution of the second frame.

7. The video controller of claim 1, wherein the transmission rate is greater than first and second display data rates, the first display data rate being a display data rate of the first display device and the second display data rate being a display data rate of the second display device.

8. The video controller of claim 1, further comprising:
a configuration manager configured to store configuration information in one or both of
one or more registers of a display controller of the first display device, and
one or more registers of a display controller of the second display device,
wherein the configuration information identifies a location of each padded scanline in the set of packed scanlines.

9. The video controller of claim 8, further comprising a lookup table,
wherein the configuration manager is configured to maintain information characterizing the first and second display devices, and
wherein the information characterizing the first and second display devices includes information identifying resolutions of the first and second display devices.

10. The video controller of claim 9,
wherein the configuration manager is configured to maintain packing schemes for combinations of two or more display devices, and
wherein the frame generator is configured to use a packing scheme associated with a combination of the first and second display devices to generate the packed frame.

11. The video controller of claim 10, wherein the packing scheme associated with the combination of the first and second display devices identifies locations of the set of padded scanlines in the packed frame.

12. The video controller of claim 1,
wherein the set of padded scanlines includes pixel values selected to cause one or more signaling conditions on one or more wires of the communication link, and
wherein the signaling conditions include any one or more of
a condition that quiesces the one or more wires of the communication link when the set of padded scanlines is transmitted,
a condition that minimizes electromagnetic interference attributable to the communication link when the set of padded scanlines is transmitted, and
a condition that minimizes power consumption of the communication link when the set of padded scanlines is transmitted.

13. A method performed at a video controller, the method comprising:
receiving and/or generating video data comprising first and second frames respectively for display at first and second display devices, the first frame comprising a set of first scanlines and the second frame comprising a set of second scanlines;
generating a padded frame based on vertical resolutions of the first and second display devices, the padded frame comprising a set of padded scanlines, and the vertical resolution of the first display device being greater than the vertical resolution of the second display device;
generating a packed frame based on the first frame, the second frame, and the padded frame, the packed frame comprising a set of packed scanlines; and
transmitting the packed frame at a transmission rate through a display port to the first and second display devices over a communication link,
wherein the communication link is coupled to both the first and second display devices, and
wherein the set of padded scanlines includes scanlines other than duplicates of the set of first scanlines and the set of second scan lines.

14. The method of claim 13,
wherein the set of packed scanlines comprises first and second packed scanline subsets,
wherein each packed scanline of the first packed scanline subset comprises one first scanline from the set of first scanlines and one second scanline from the set of second scanlines, and
wherein each packed scanline of the second packed scanline subset comprises one first scanline from the set of first scanlines and one padded scanline from the set of padded scanlines.

15. The method of claim 14, wherein generating the packed frame comprises:
interleaving the packed scanlines of the first packed scanline subset with the packed scanlines of the second packed scanline subset such that a frame buffering requirement at the first display device and/or the second display device is less than an entirety of the packed frame.

16. The method of claim 13,
wherein Hpacked=H1+H2 in which Hpacked represents a horizontal resolution of the packed frame, and H1 and H2 respectively represent horizontal resolutions of the first and second frames,
wherein Vpacked=V1 in which Vpacked represents a vertical resolution of the packed frame and V1 represents a vertical resolution of the first frame,
wherein Hpadded=H2 in which Hpadded represents a horizontal resolution of the padded frame, and
wherein Vpadded=V1−V2 in which Vpadded represents a vertical resolution of the padded frame, and V2 represents a vertical resolution of the second frame.

17. The method of claim 13, wherein the transmission rate is greater than first and second display data rates, the first display data rate being a display data rate of the first display device and the second display data rate being a display data rate of the second display device.

18. The method of claim 13, further comprising:
storing configuration information in one or both of
one or more registers of a display controller of the first display device, and
one or more registers of a display controller of the second display device,
wherein the configuration information identifies a location of each padded scanline in the set of packed scanlines.

19. The method of claim 13, further comprising:
maintaining information characterizing the first and second display devices in a lookup table of the video controller,
wherein the information characterizing the first and second display devices includes information identifying resolutions of the first and second display devices.

20. The method of claim 19, further comprising:
maintaining packing schemes for combinations of two or more display devices; and
using a packing scheme associated with a combination of the first and second display devices to generate the packed frame,
wherein the packing scheme associated with the combination of the first and second display devices identifies locations of the set of padded scanlines in the packed frame.

21. The method of claim 13,
wherein the set of padded scanlines includes pixel values selected to cause one or more signaling conditions on one or more wires of the communication link, and
wherein the signaling conditions include any one or more of
a condition that quiesces the one or more wires of the communication link when the set of padded scanlines is transmitted,
a condition that minimizes electromagnetic interference attributable to the communication link when the set of padded scanlines is transmitted, and
a condition that minimizes power consumption of the communication link when the set of padded scanlines is transmitted.

22. A video controller comprising:
means for receiving and/or generating video data comprising first and second frames respectively for display at first and second display devices, the first frame comprising a set of first scanlines and the second frame comprising a set of second scanlines;
means for generating a padded frame based on vertical resolutions of the first and second display devices, the padded frame comprising a set of padded scanlines, and the vertical resolution of the first display device being greater than the vertical resolution of the second display device;
means for generating a packed frame based on the first frame, the second frame, and the padded frame, the packed frame comprising a set of packed scanlines; and
means for transmitting the packed frame at a transmission rate through a display port to the first and second display devices over a communication link,
wherein the communication link is coupled to both the first and second display devices, and
wherein the set of padded scanlines includes scanlines other than duplicates of the set of first scanlines and the set of second scan lines.

23. The video controller of claim 22,
wherein the set of packed scanlines comprises first and second packed scanline subsets,
wherein each packed scanline of the first packed scanline subset comprises one first scanline from the set of first scanlines and one second scanline from the set of second scanlines, and
wherein each packed scanline of the second packed scanline subset comprises one first scanline from the set of first scanlines and one padded scanline from the set of padded scanlines.

24. The video controller of claim 23, wherein the means for generating the packed frame interleaves the packed scanlines of the first packed scanline subset with the packed scanlines of the second packed scanline subset such that a frame buffering requirement at the first display device and/or the second display device is less than an entirety of the packed frame.

25. The video controller of claim 22, further comprising:
means for storing configuration information in one or both of
one or more registers of a display controller of the first display device, and
one or more registers of a display controller of the second display device,
wherein the configuration information identifies a location of each padded scanline in the set of packed scanlines.

26. A non-transitory processor readable medium configured to store code that, when executed by a processor or processors of a video controller, causes the video controller to:
receive and/or generate video data comprising first and second frames respectively for display at first and second display devices, the first frame comprising a set of first scanlines and the second frame comprising a set of second scanlines;
generate a padded frame based on vertical resolutions of the first and second display devices, the padded frame comprising a set of padded scanlines, and the vertical resolution of the first display device being greater than the vertical resolution of the second display device;
generate a packed frame based on the first frame, the second frame, and the padded frame, the packed frame comprising a set of packed scanlines; and
transmit the packed frame at a transmission rate through a display port to the first and second display devices over a communication link,
wherein the communication link is coupled to both the first and second display devices, and
wherein the set of padded scanlines includes scanlines other than duplicates of the set of first scanlines and the set of second scan lines.

27. A display controller of a display device, comprising:
an interface port configured to receive a packed frame from a video controller over a communication link at a transmission rate, the packed frame comprising a set of packed scanlines, and the communication link also being coupled to another display device;
a frame filter configured to extract a display frame and another display frame from the packed frame, the display frame comprising a set of display scanlines, and the another display frame comprising a set of other display scanlines; and
a display driver configured to drive the display device with the display frame at a display data rate,
wherein vertical resolutions of the display device and the another display device are different,
wherein the transmission rate is greater than the display data rate,
wherein the packed frame is based on the display frame, the another display frame, and a padded frame,
wherein the padded frame comprises a set of padded scanlines,
wherein the set of packed scanlines of the packed frame comprises first and second packed scanline subsets,
wherein each packed scanline of the first packed scanline subset comprises one display, scanline from the set of display scanlines and one other display scanline from the set of other display scanlines,
wherein when the vertical resolution of the display device is greater than the vertical resolution of the another display device, each packed scanline of the second packed scanline subset comprises one display scanline from the set of display scanlines and one padded scanline from the set of padded scanlines, and
wherein when the vertical resolution of the display device is smaller than the vertical resolution of the another display device, each packed scanline of the second packed scanline_subset comprises one other display scanline from the set of other display scanlines and one padded scanline from the set of padded scanlines.

28. The display controller of claim 27,
wherein the interface port is configured to transmit the another display frame to another display controller of the another display device at another transmission rate, and
wherein the transmission rate is greater than the another transmission rate.

29. The display controller of claim 27,
wherein the display driver is configured to drive the another display device with the another display frame at another display data rate, and
wherein the transmission rate is greater than the another display data rate.

30. The display controller of claim 27, wherein the frame filter is configured to:
extract the display frame by filtering the set of display scanlines from the set of packed scanlines, and
extract the another display frame by filtering the set of other display scanlines from the set of packed scanlines.

31. The display controller of claim 27, further comprising:
one or more registers configured to store configuration information identifying a location of each padded scanline in the set of packed scanlines,
wherein the frame filter is configured to extract the display frame and the another display frame based on the configuration information stored in the one or more registers.

32. A method performed at a display controller of a display device, the method comprising:
receiving a packed frame from a video controller over a communication link at a transmission rate, the packed frame comprising a set of packed scanlines, and the communication link also being coupled to another display device;
extracting a display frame and another display frame from the packed frame, the display frame comprising a set of display scanlines, and the another display frame comprising a set of other display scanlines; and
driving the display device with the display frame at a display data rate,
wherein vertical resolutions of the display device and the another display device are different,
wherein the transmission rate is greater than the display data rate,
wherein the packed frame is based on the display frame, the another display frame, and a padded frame,
wherein the padded frame comprises a set of padded scanlines,
wherein the set of packed scanlines of the packed frame comprises first and second packed scanline subsets,
wherein each packed scanline of the first packed scanline subset comprises one display scanline from the set of display scanlines and one other display scanline from the set of other display scanlines,
wherein when the vertical resolution of the display device is greater than the vertical resolution of the another display device, each packed scanline of the second packed scanline subset comprises one display scanline from the set of display scanlines and one padded scanline from the set of padded scanlines, and
wherein when the vertical resolution of the display device is smaller than the vertical resolution of the another display device, each packed scanline of the second packed scanline subset comprises one other display scanline from the set of other display scanlines and one padded scanline from the set of padded scanlines.

33. The method of claim 32, further comprising:
transmitting the another display frame to another display controller of the another display device at another transmission rate when the another display device is controlled by the another display controller,
wherein the transmission rate is greater than the another transmission rate.

34. The method of claim 32, further comprising:
driving the another display device with the another display frame at another display data rate when the display controller is also a display controller of the another display device,
wherein the transmission rate is greater than the another display data rate.

35. The method of claim 32, wherein the display frame and the another display frame are extracted from the packed frame based on configuration parameters stored in one or more registers of the display controller.

36. A display controller of a display device, comprising:
means for receiving a packed frame from a video controller over a communication link at a transmission rate, the packed frame comprising a set of packed scanlines, and the communication link also being coupled to another display device;
means for extracting a display frame and another display frame from the packed frame, the display frame comprising a set of display scanlines, and the another display frame comprising a set of other display scanlines; and
means for driving the display device with the display frame at a display data rate,
wherein vertical resolutions of the display device and the another display device are different,
wherein the transmission rate is greater than the display data rate,
wherein the packed frame is based on the display frame, the another display frame, and a padded frame,
wherein the padded frame comprises a set of padded scanlines,
wherein the set of packed scanlines of the packed frame comprises first and second packed scanline subsets,
wherein each packed scanline of the first packed scanline subset comprises one display scanline from the set of display scanlines and one other display scanline from the set of other display scanlines,
wherein when the vertical resolution of the display device is greater than the vertical resolution of the another display device, each packed scanline of the second packed scanline subset comprises one display scanline from the set of display scanlines and one padded scanline from the set of padded scanlines, and
wherein when the vertical resolution of the display device is smaller than the vertical resolution of the another display device, each packed scanline of the second packed scanline subset comprises one other display scanline from the set of other display scanlines and one padded scanline from the set of padded scanlines.

37. A non-transitory processor readable medium configured to store code that, when executed by a processor or processors of a display controller of a display device, causes the display controller to:
receive a packed frame from a video controller over a communication link at a transmission rate, the packed frame comprising a set of packed scanlines, and the communication link also being coupled to another display device;
extract a display frame and another display frame from the packed frame, the display frame comprising a set of display scanlines, and the another display frame comprising a set of other display scanlines; and
drive the display device with the display frame at a display data rate,
wherein vertical resolutions of the display device and the another display device are different,
wherein the transmission rate is greater than the display data rate,
wherein the packed frame is based on the display frame, the another display frame, and a padded frame,
wherein the padded frame comprises a set of padded scanlines,
wherein the set of packed scanlines of the packed frame comprises first and second packed scanline subsets,
wherein each packed scanline of the first packed scanline subset comprises one display scanline from the set of display scanlines and one other display scanline from the set of other display scanlines,
wherein when the vertical resolution of the display device is greater than the vertical resolution of the another display device, each packed scanline of the second packed scanline subset comprises one display scanline from the set of display scanlines and one padded scanline from the set of padded scanlines, and
wherein when the vertical resolution of the display device is smaller than the vertical resolution of the another display device, each packed scanline of the second packed scanline subset comprises one other display scanline from the set of other display scanlines and one padded scanline from the set of padded scanlines.

38. The display controller of claim 27, wherein the display controller does not include any serializer/deserializer (SERDES) pairs.

* * * * *